(12) United States Patent
Hesketh-Prichard et al.

(10) Patent No.: US 11,174,995 B2
(45) Date of Patent: Nov. 16, 2021

(54) HYDRATE REMEDIATION SYSTEMS, APPARATUSES AND METHODS OF MAKING AND USING SAME

(71) Applicants: Richard Michael Hesketh-Prichard, Houston, TX (US); Adrian Richard Brimmer, Houston, TX (US)

(72) Inventors: Richard Michael Hesketh-Prichard, Houston, TX (US); Adrian Richard Brimmer, Houston, TX (US)

( * ) Notice: Subject to any disclaimer, the term of this patent is extended or adjusted under 35 U.S.C. 154(b) by 481 days.

(21) Appl. No.: 16/304,416

(22) PCT Filed: May 24, 2017

(86) PCT No.: PCT/US2017/034134
§ 371 (c)(1),
(2) Date: Nov. 26, 2018

(87) PCT Pub. No.: WO2017/205448
PCT Pub. Date: Nov. 30, 2017

(65) Prior Publication Data
US 2019/0145582 A1    May 16, 2019

Related U.S. Application Data

(60) Provisional application No. 62/341,304, filed on May 25, 2016.

(51) Int. Cl.
*F17D 1/18* (2006.01)
*H05B 3/06* (2006.01)
*B08B 9/027* (2006.01)
*F16L 53/37* (2018.01)
*F16L 53/35* (2018.01)
*B08B 7/00* (2006.01)

(52) U.S. Cl.
CPC .............. *F17D 1/18* (2013.01); *B08B 7/0071* (2013.01); *B08B 9/027* (2013.01); *F16L 53/35* (2018.01); *F16L 53/37* (2018.01); *H05B 3/06* (2013.01)

(58) Field of Classification Search
None
See application file for complete search history.

(56) References Cited

U.S. PATENT DOCUMENTS

| 4,445,804 A | 5/1984 | Abdallah et al. |
|---|---|---|
| 4,705,331 A | 11/1987 | Britton |
| 8,757,269 B2 | 6/2014 | Tabor et al. |
| 8,800,575 B2 | 8/2014 | Angel et al. |
| 2008/0063478 A1 | 3/2008 | Reddy |

FOREIGN PATENT DOCUMENTS

WO    2012-068251 A2    5/2012

OTHER PUBLICATIONS

PCT/US2017/034134—Oct. 17, 2017—International Preliminary Report on Patentability.
PCT/US2017/034134—Oct. 17, 2017 PCTI SR and PCT Written Open.

*Primary Examiner* — Thor S Campbell
(74) *Attorney, Agent, or Firm* — Robert W. Strozier

(57) ABSTRACT

Hydrate remediation systems, apparatuses, and methods of making and using same including at least one pair of electrodes detachably or fixedly attached to a pipeline or flowline in a spaced relationship so that a current may be imposed across a section of the pipeline or flowline between each pair of electrodes resulting in electrical heating of the section for a time sufficient to raise a temperature of a fluid in the section of the pipeline or flowline to a temperature above a dissociation temperature of hydrates formed in the fluid.

20 Claims, 18 Drawing Sheets

HYDRATE REMEDIATION SYSTEMS, APPARATUSES AND METHODS OF MAKING AND USING SAME

RELATED APPLICATIONS

This application claims the benefit of and is a 35 U.S.C. § 371 national phase filing of PCT/US17/34134 filed May 24, 2017, which claims the benefit of and priority to United States Provisional Patent Application Ser. No. 62/341,304 filed May 25, 2016 (25 May 2016).

BACKGROUND OF THE DISCLOSURE

1. Field of the Disclosure

Embodiments of this disclosure relate to hydrate remediation systems, apparatuses, and methods of making and using same.

More particularly, embodiments of this disclosure relate to hydrate remediation systems, apparatuses, and methods of making and using same, where the apparatuses and systems include at least one pair of electrodes detachably attached to a pipeline or flowline in a spaced relationship to form low resistance, high current contacts with the outer surface of the pipeline or flowline so that a high current may be imposed across a section of the pipeline or flowline between pairs of electrodes resulting in electrical heating of the section for a time sufficient to raise a temperature of a fluid, a solid, or both inside the section of the pipeline or flowline to a temperature above a dissociation temperature of hydrates formed in the fluid. One aspect of the disclosure is the formation of the electrical contacts between the electrodes surfaces and the surface of the steel flowline have low resistance sufficient to carry a high current through the section of the flowline between two detachable electrodes, which provides the heat to dissociated hydrate plugs in the flowline.

2. Description of the Related Art

Methane hydrate is a solid similar to ice, but with some important differences. Unlike ice which has only one component—water, methane hydrate has two components—water and methane ($CH_4$) or other lower hydrocarbons. Also, ice forms and melts at a specific temperature—0° C. (32° F.) that does not vary significantly with pressure, whereas the temperature at which hydrate forms and melts does depend upon pressure. The graph in FIG. 1 shows the phase boundary between the region where methane and water combine to form solid methane hydrate and the region where methane and water exist separately as a gas and a liquid). FIG. 2 shows a representative structure of simple methane hydrate.

The temperature-pressure relationship shown in FIG. 1 is for illustrative purposes and the exact shape and position of the curve is influenced by the presence of other substances such as salts usually present in produced water, other hydrocarbons such as ethane, propane etc. and, of course, hydrate inhibitors.

Structurally, methane hydrates are solids comprised of hydrocarbon gases trapped within cavities of a rigid "cage-like" lattice of water molecules as shown in FIG. 2. A simple methane hydrate molecule is usually depicted as a dodecahedron with a water molecule at each vertex of the dodecahedron and a methane molecule captured in the middle. There are other more complex forms of hydrate, but their properties are similar to those of simple methane hydrate.

In oil and gas production systems, the produced fluids almost always contain hydrocarbon gases such as methane, liquid hydrocarbons such as condensate or oil, and water—so the components required for hydrate formation are usually present. If the temperature and pressure of the produced fluids are conducive to hydrate formation, granules of hydrate will begin to form. Initially, they will be carried along with the produced fluids; however, if the fluids are static or flowing slowly the granules may agglomerate and, unless the operator treats the affected area with an inhibitor while there is still a flow path, the flowline may become blocked.

Like the freezing of water to ice, hydrate formation is exothermic. That is to say, it gives up its latent heat to its surrounding environment as it changes state. Water and methane give up 438 J/gm (188 Btu/lb) as they combine to form solid hydrate—about 30% more than the energy that water gives up as it changes to ice. The same amount of heat energy must be provided to the hydrate to make it dissociate into its components, e.g., methane and water.

Under steady-state flowing conditions, the flowing wellhead temperature of a typical oil or gas well is greater than the hydrate formation temperature at the wellhead pressure. However, as the produced fluids flow along the flowline to the host platform, they lose heat to the surrounding seawater. Depending upon the length of the flowline and how it is insulated, the produced fluids may cool down enough to cross the phase boundary (FIG. 1) into the hydrate formation region. Under these conditions, without precautionary measures, there is a risk that hydrate plug would form and block the flowline.

The problem is greater during transient flowing conditions such as a production shutdown or the subsequent production re-start. During these operations, the temperature and pressure excursions are more extreme and the risk that a hydrate plug will form and block the flowline is greater. For these reasons a typical subsea oil or gas production system has facilities for injecting chemicals such as methanol, ethylene glycol and low dosage hydrate inhibitor (LDHI) at various points to manage the risk that a hydrate plug will form and block the flowline.

The effective management of hydrates in a subsea production system depends upon the operator's skill and experience—particularly where several wells with different characteristics share the same flowline. Occasionally, a flowline will become blocked and, when it does, the remediation by conventional methods can take weeks and is very costly.

SUMMARY OF THE DISCLOSURE

Embodiments of this disclosure relate to systems and apparatuses for hydrate remediation including a high current subsea power subsystem including at least one pair of electrodes detachably or affixedly attached to a flowline at two locations along a length of the flowline separated by a distance d, a step-down transformer, and a high current power cable connecting the step-down transformer to each electrode. The step-down transformer applies a low voltage across each pair of electrodes permitting a high current to flow through a section of the flowline between each pair of electrodes heating the flowline sections. The voltage is maintained between the electrodes for a time sufficient to heat the contents of each of the sections above a dissociation temperature of the hydrates. If the section is plugged by hydrate, then the electric current is applied across each section until the hydrate of the hydrate plug dissociates into its gas and liquid components unplugging the flowline section.

Embodiments of this disclosure relate to methods for heating a section of a flowline or pipeline. The methods include attaching a pair of electrodes at two locations separated by a distance d along a flowline including a section to be heated. The methods also include applying a low voltage across a section between the electrodes and allowing a high current to flow through the section of the pipeline to heat the metal of the section. The methods further include continuing the current flow through the section of the pipeline for a time sufficient for the metal in the section to be heated and for a fluid including hydrate and/or solid hydrate plug within the section of the flowline to be heated until the fluid and/or solid is heated to a temperature above the dissociation temperature of the hydrates in the section.

BRIEF DESCRIPTION OF THE DRAWINGS OF THE DISCLOSURE

The disclosure can be better understood with reference to the following detailed description together with the appended illustrative drawings in which like elements are numbered the same:

Figure 5A:
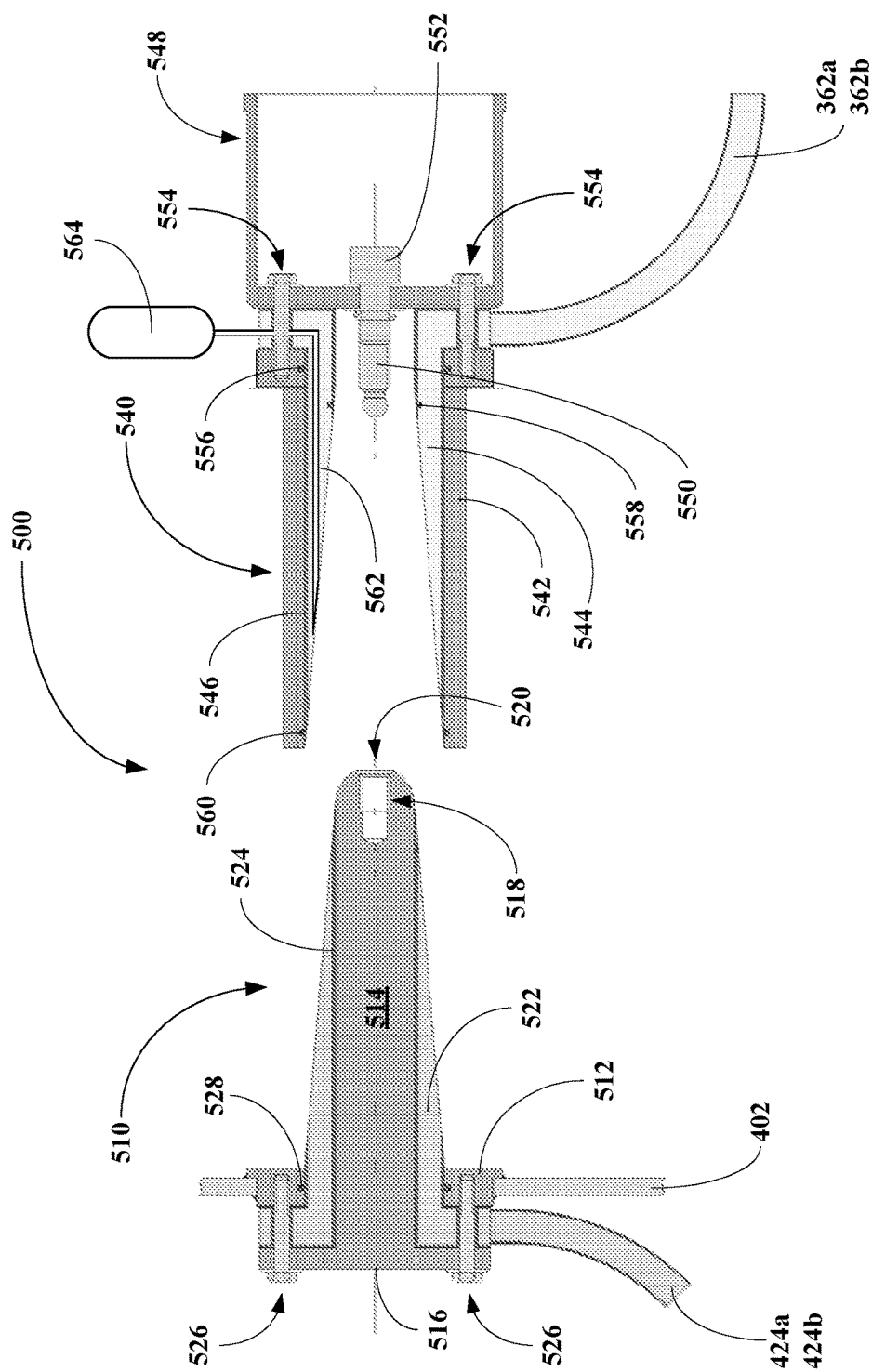

FIGS. 5A&B depict an embodiment of a low voltage, high current connector: A) disconnected and B) connected.

Figure 6A:
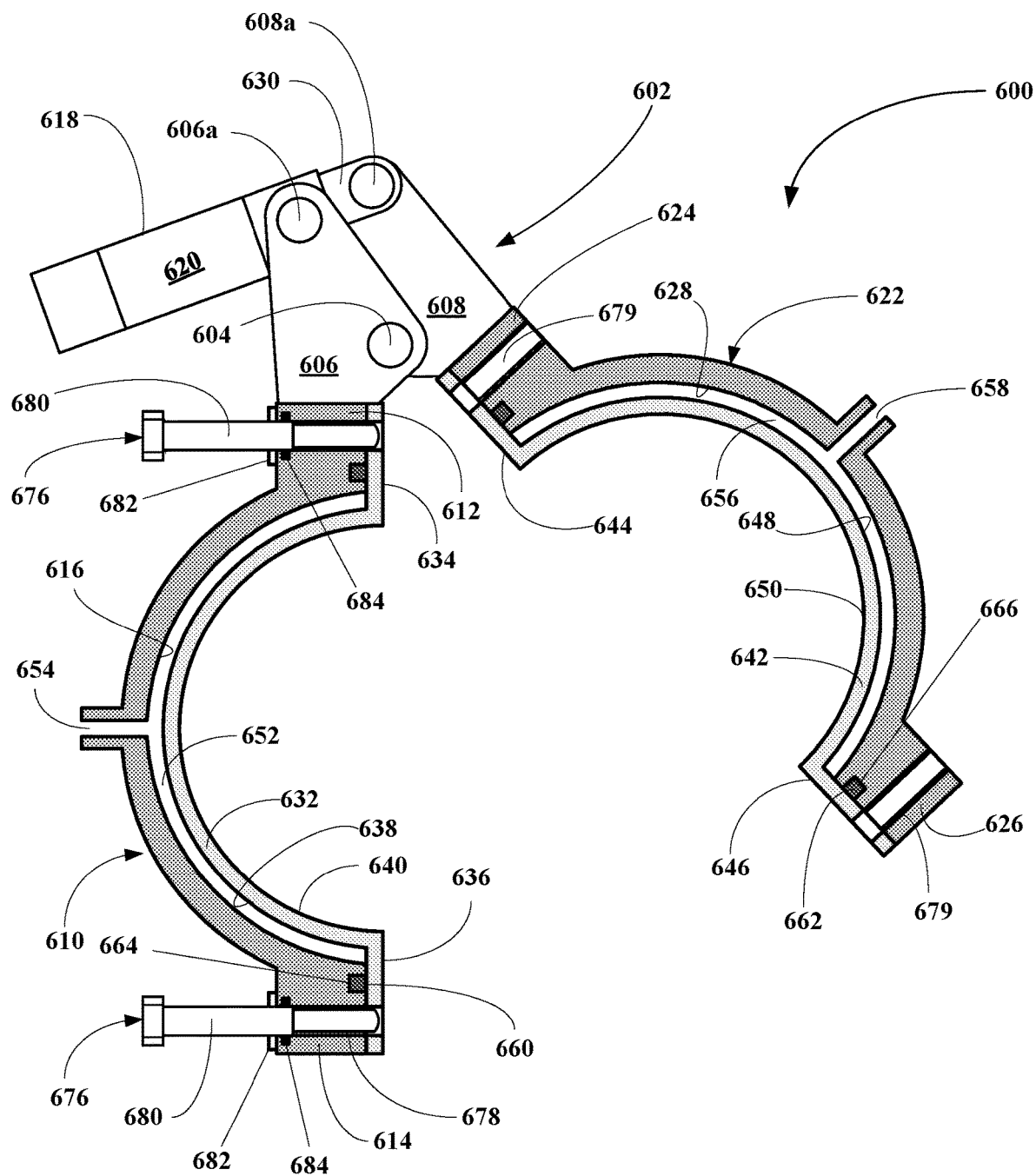

FIG. 6A depicts a lateral cross-sectional view of an embodiment of an electrode assembly in its opened state.

Figure 6B:
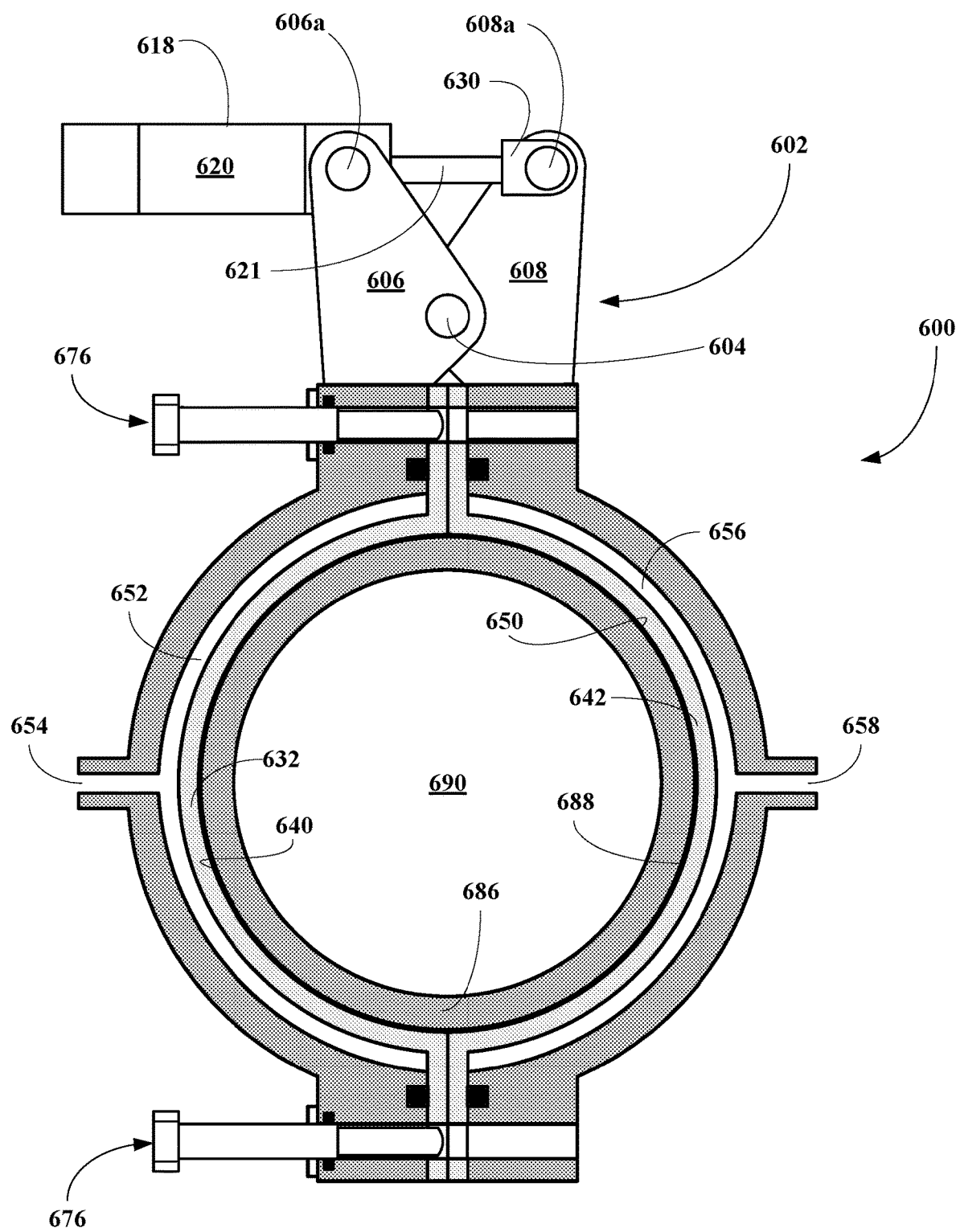

FIG. 6B depicts a lateral cross-sectional view of the electrode assembly of FIG. 6A in its closed state.

Figure 6C:
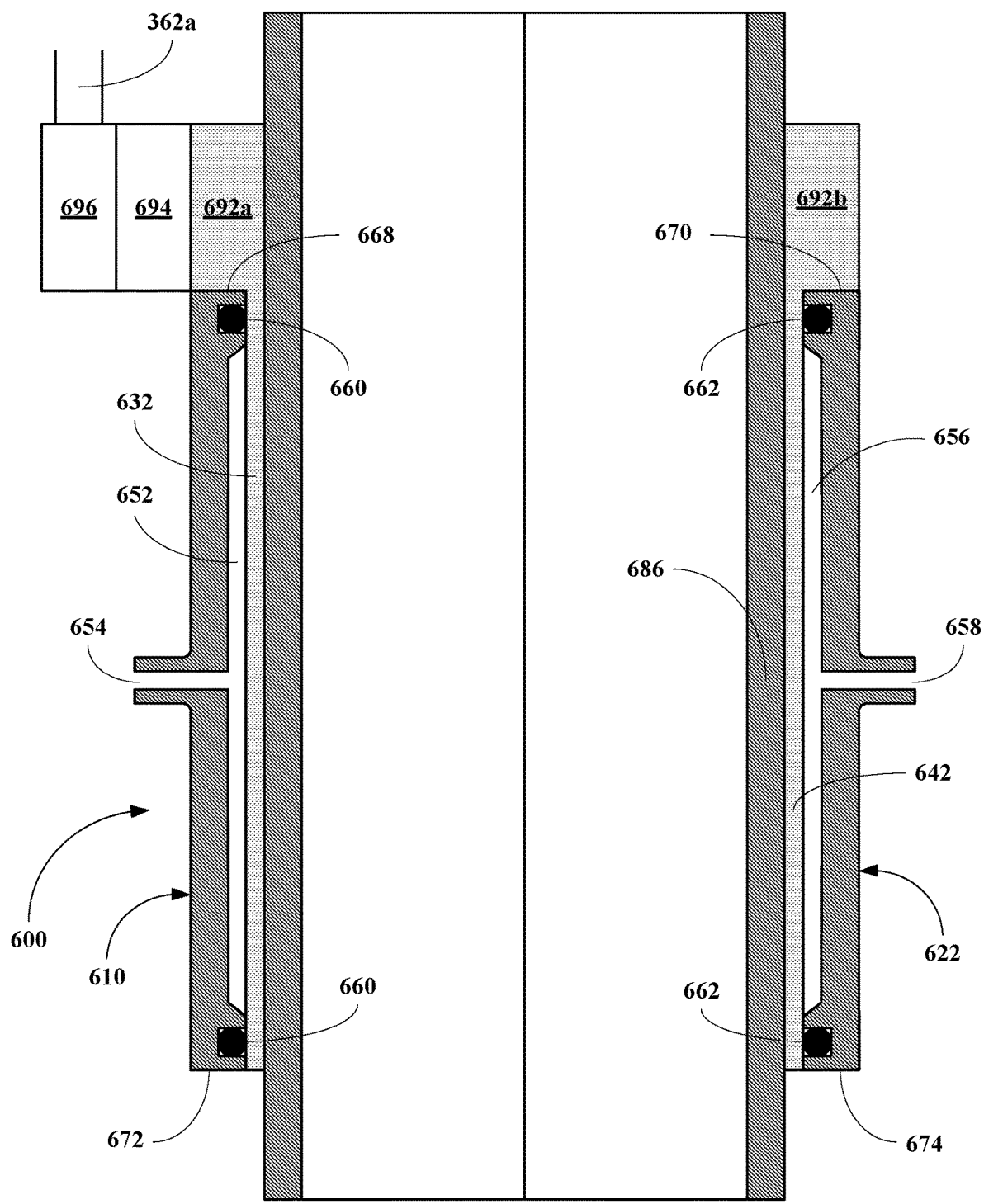

FIG. 6C depicts a longitudinal cross-sectional view of the electrode assembly of FIG. 6A in its closed state.

Figure 6D:
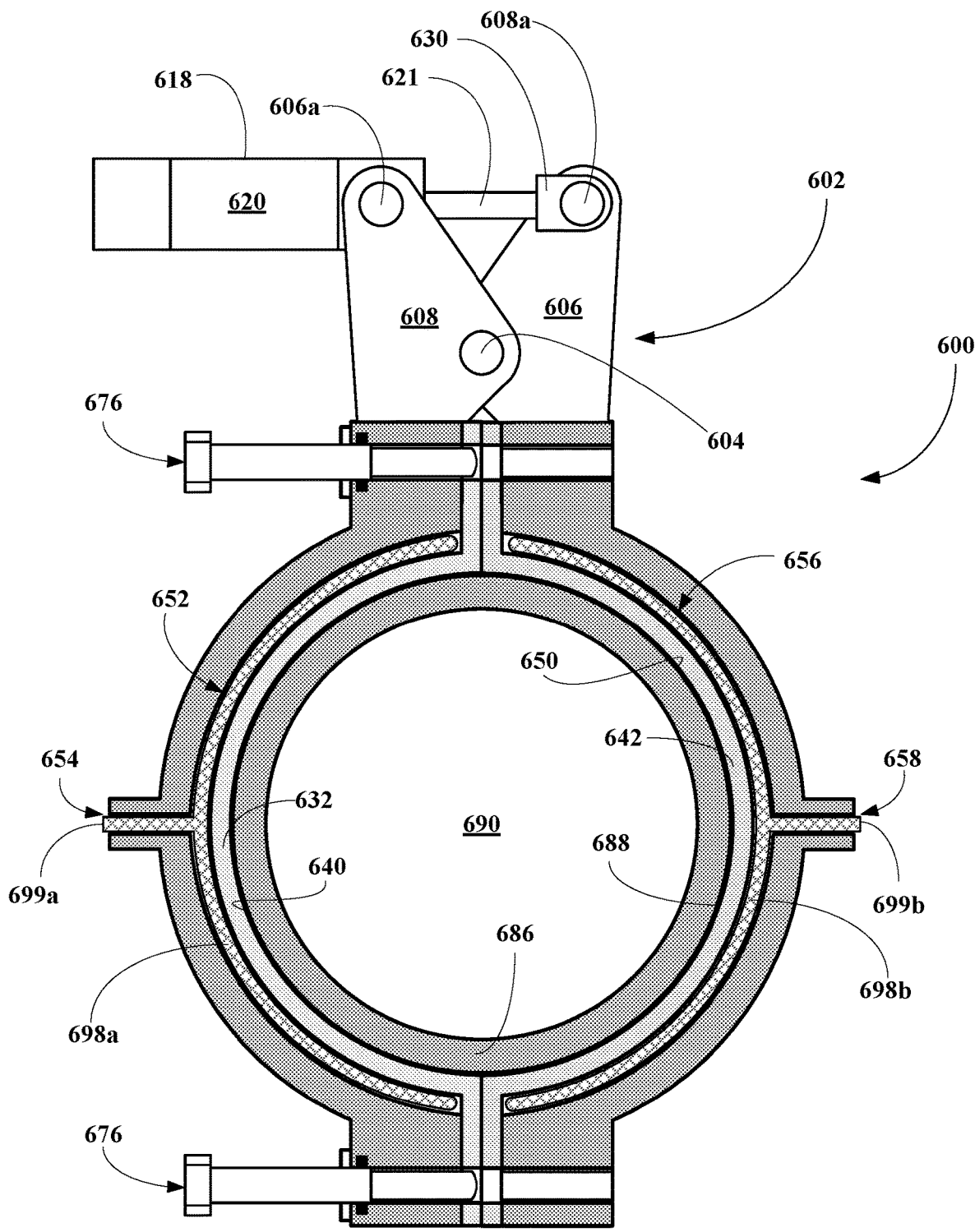

FIG. 6D depicts a lateral cross-sectional view of the electrode assembly of FIG. 6A in its closed state including two bladders—one in each semi-cylindrical clamshell.

Figure 6E:
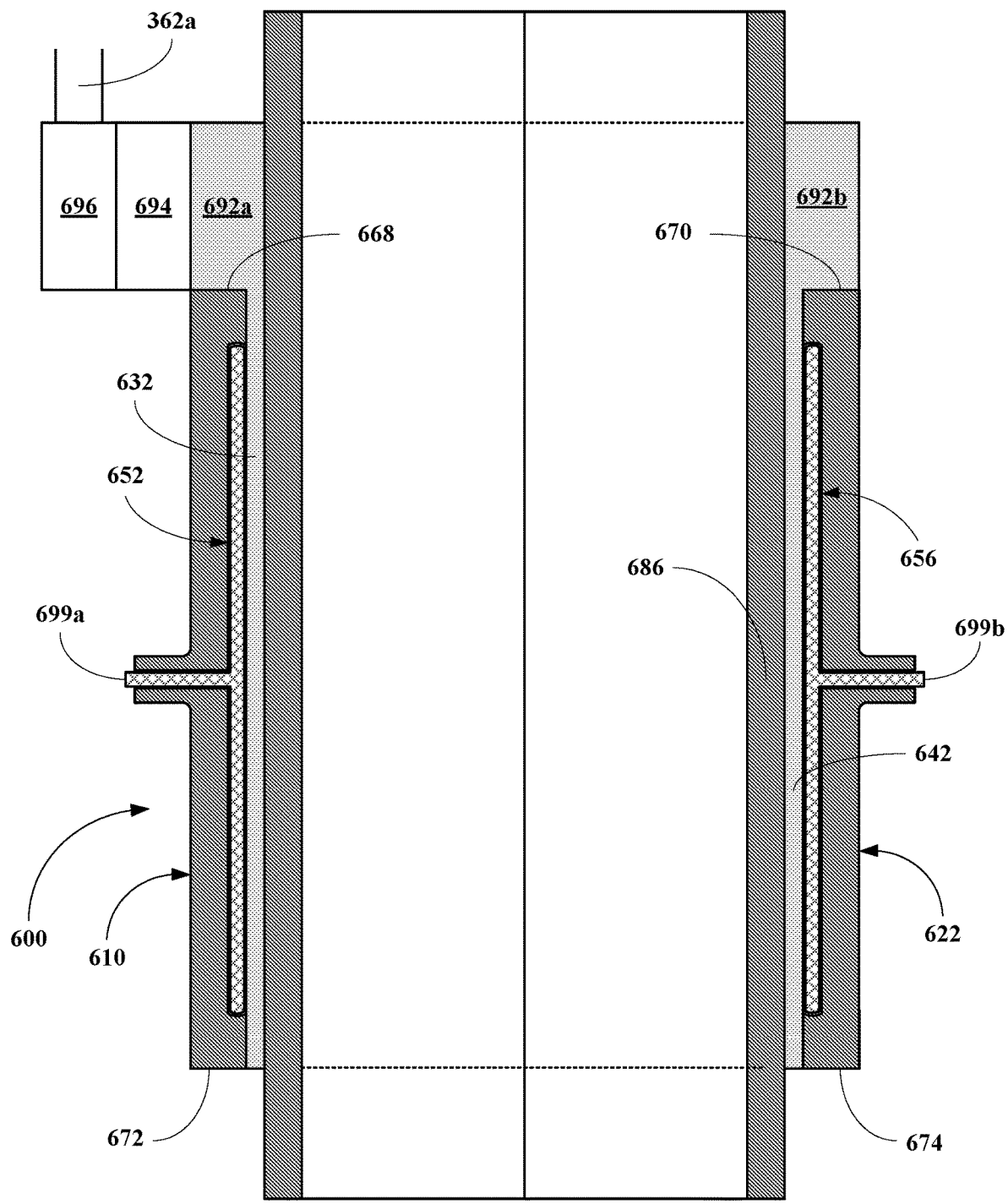

FIG. 6E depicts a longitudinal cross-sectional view of the electrode assembly of FIG. 6D.

Figure 6F:
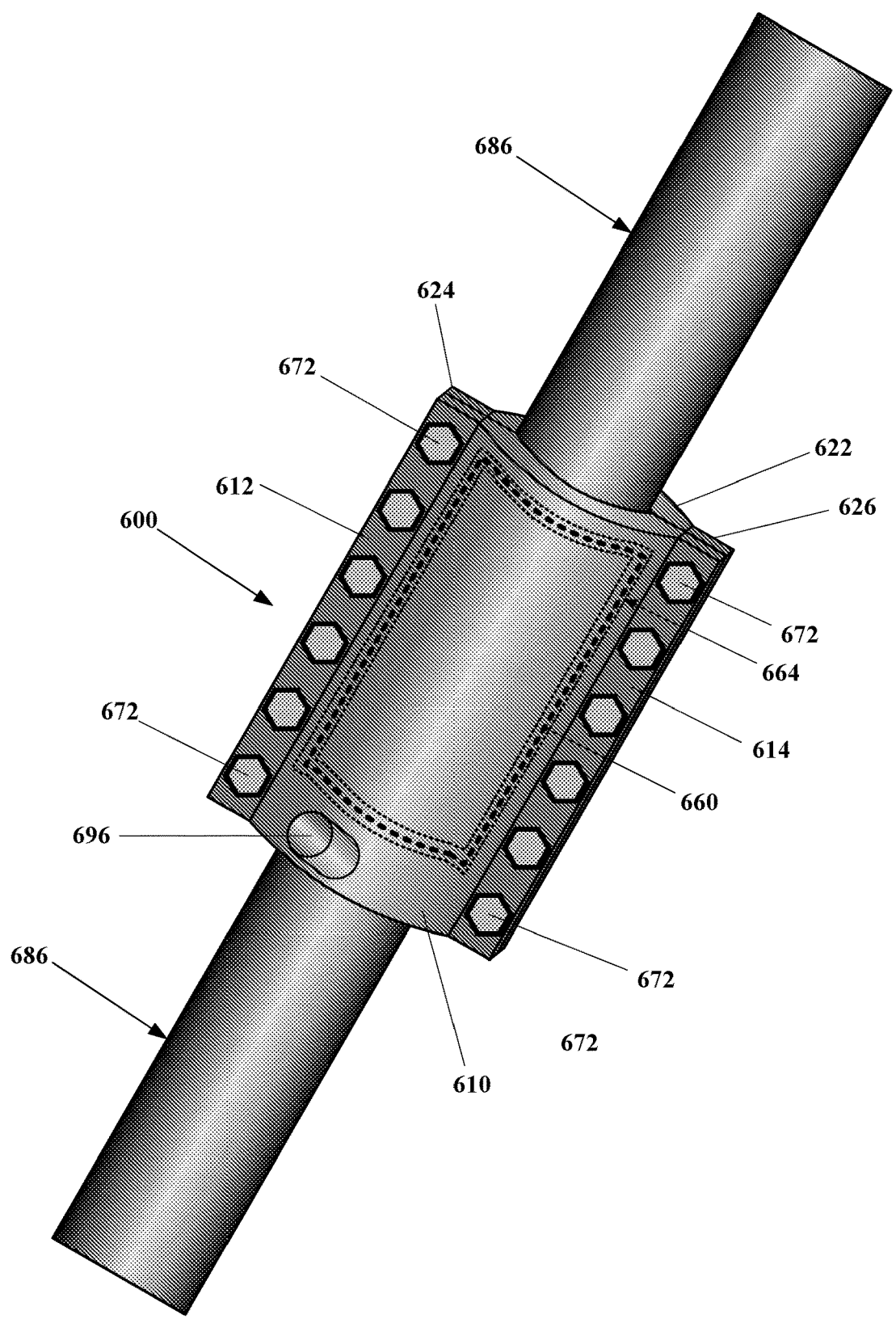

FIG. 6F depicts a perspective 3D view of the electrode assembly of FIGS. 6A&D showing the seal and groove for one of the clamping assemblies.

Figure 7A:
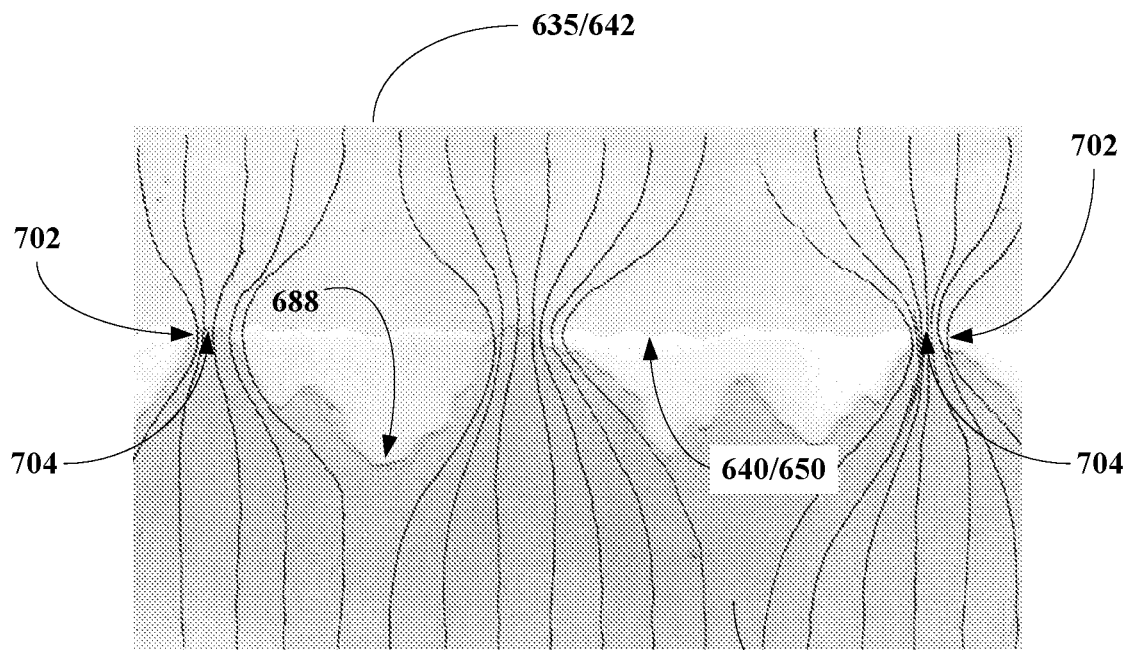

FIG. 7A depicts a diagram of current flow across a rough surface and a smooth surface, representing an outer surface of a steel flowline and a smooth surface of an electrode.

Figure 7B:
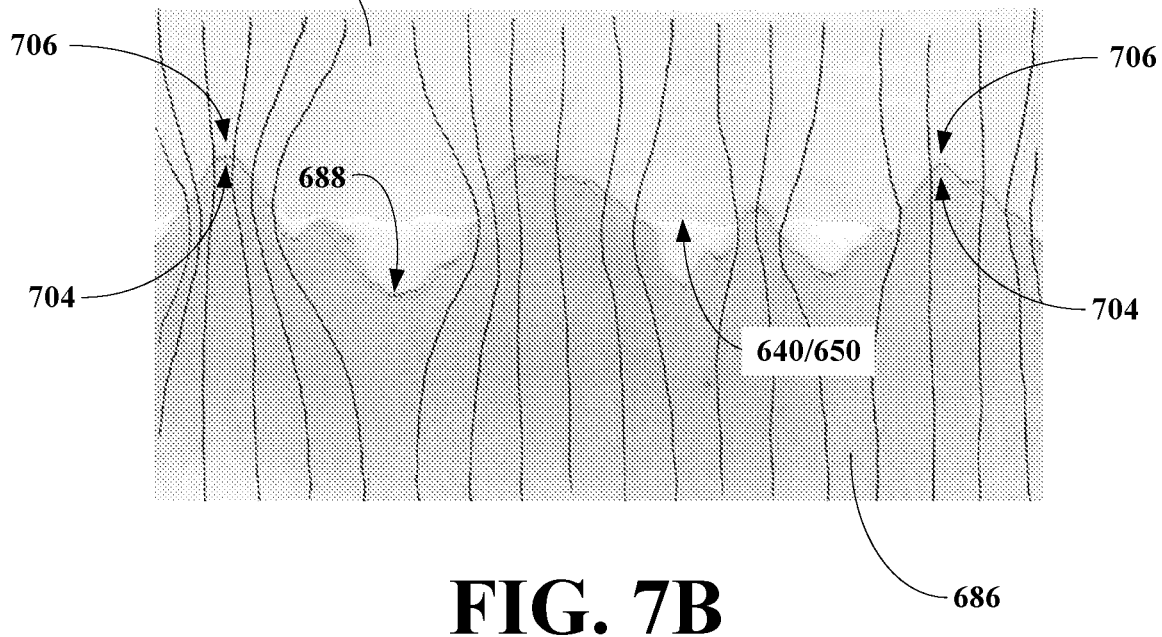

FIG. 7B depicts a diagram of current flow across a rough surface and a smooth surface, representing an outer surface of a steel flowline and a smooth surface of an electrode after applying pressure against the electrode forcing the electrode material into the rough surface irregularities.

Figure 8:
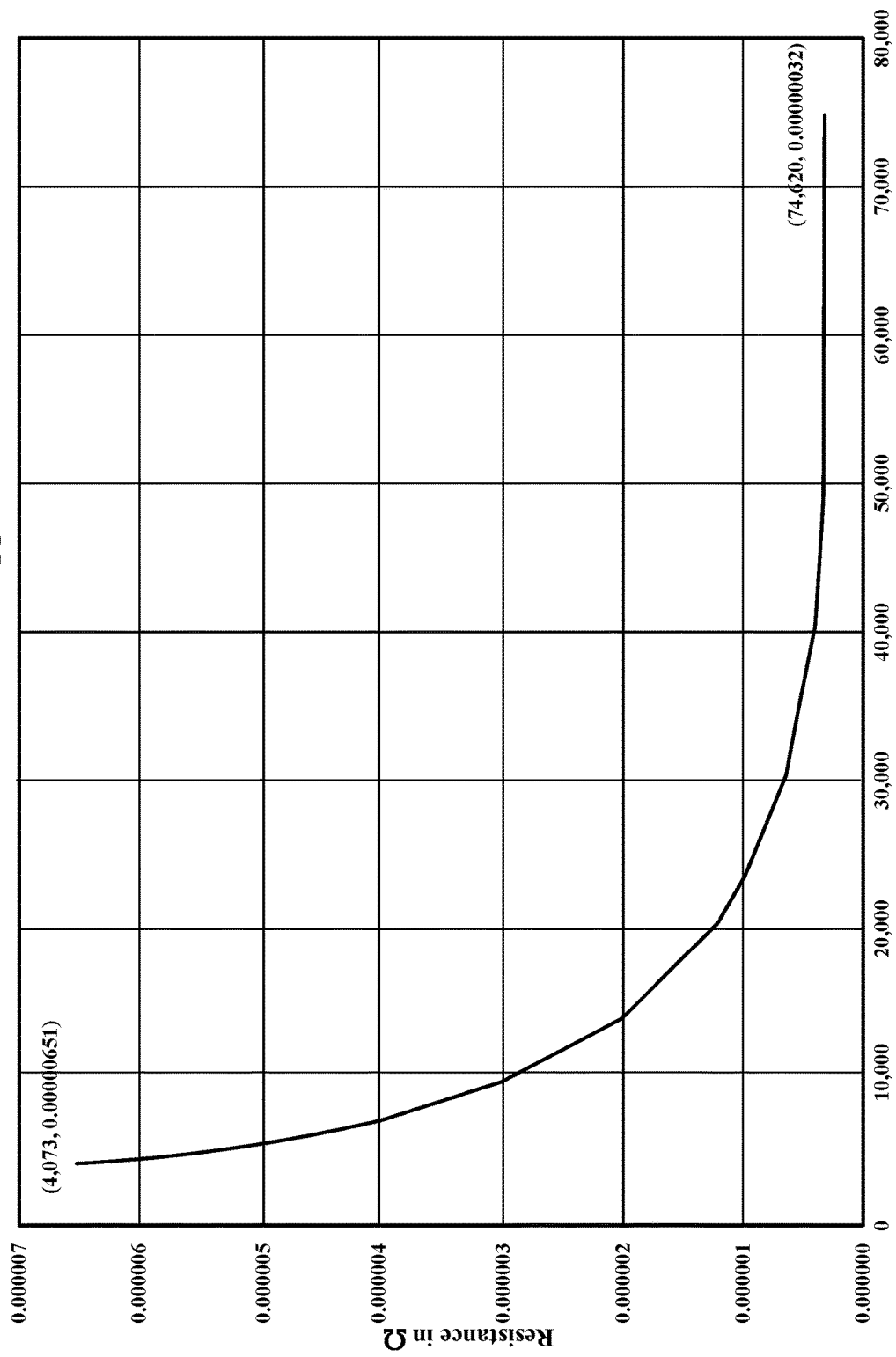

FIG. 8 depicts a graph of contact resistance as a function of pressure.

Figure 9A:
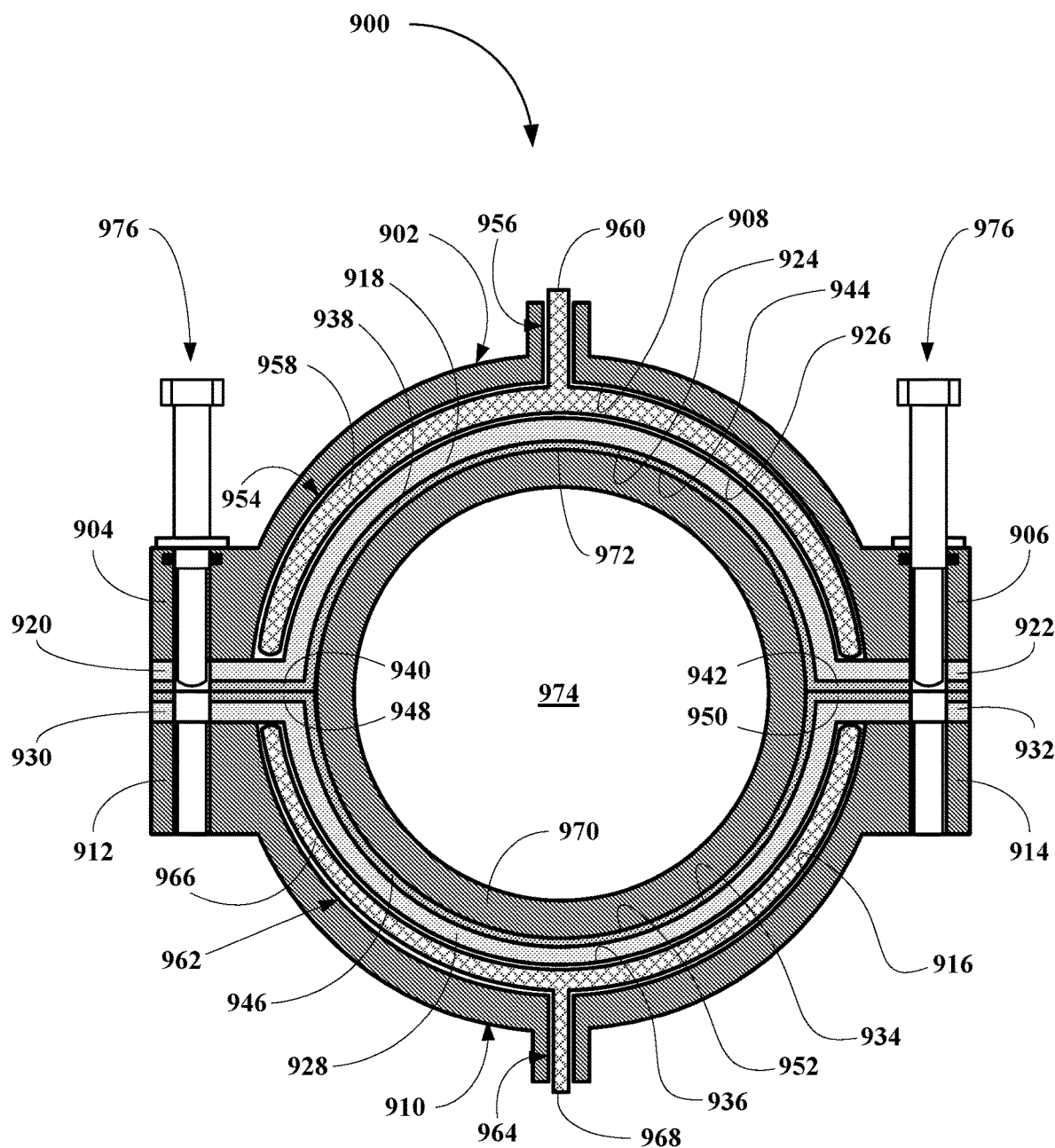

FIGS. 9A&B depict two electrode assemblies having different electrode structures.

Figure 10A:
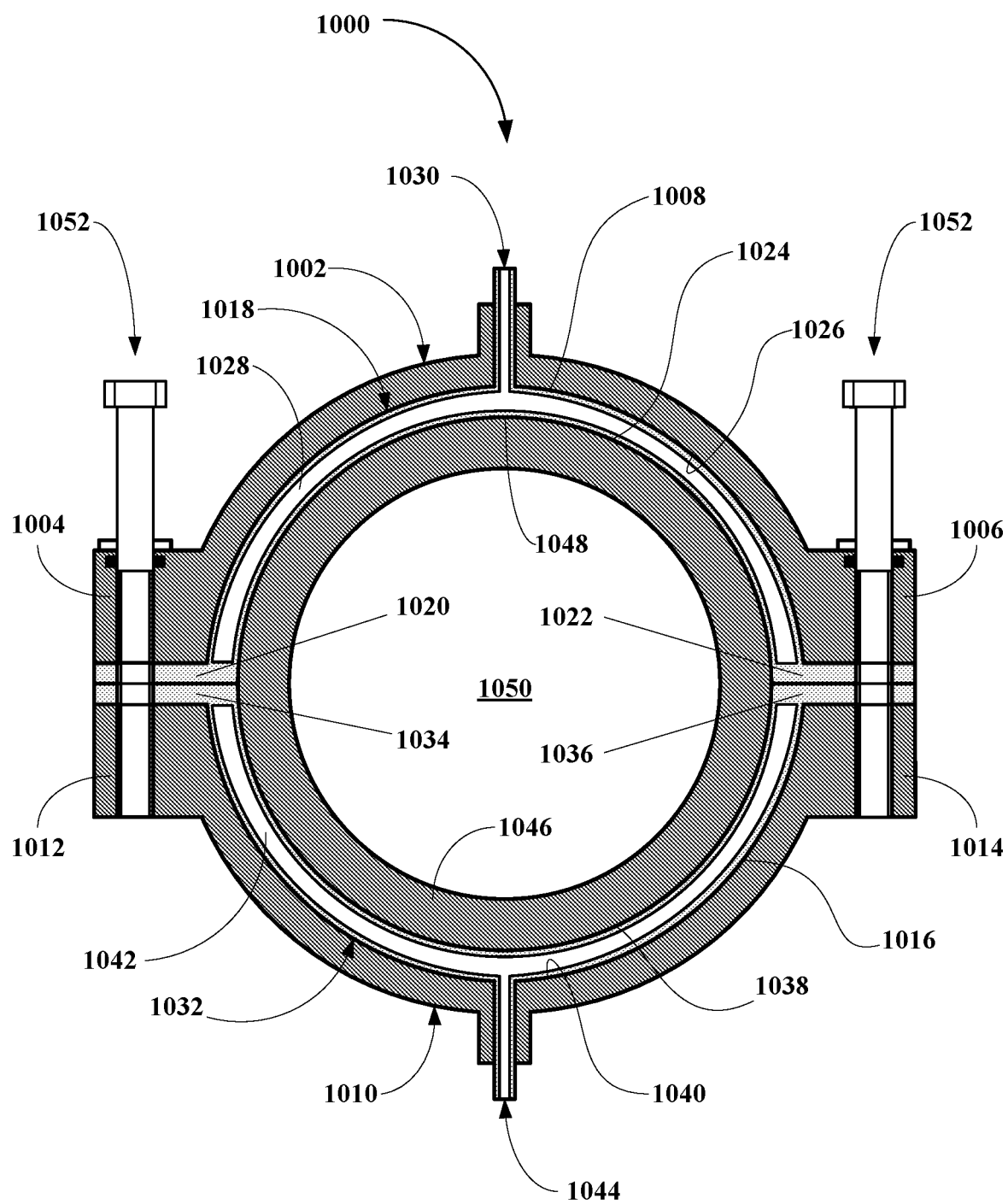

FIGS. 10A&B depict two other electrode assemblies having different electrode structures.

DEFINITIONS USED IN THE DISCLOSURE

The term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within ±5% of the stated value. In other embodiments, the value is within ±2.5% of the stated value. In other embodiments, the value is within ±1% of the stated value. In other embodiments, the value is within ±0.5% of the stated value. In other embodiments, the value is within ±0.1% of the stated value.

The term a "mixture" means a heterogeneous or homogeneous composition of two or more components, where the hetero or homogeneity exists at the molecular level. Examples include sugar and water, emulsions, dispersions, suspensions, etc.

The term a "combination" means a structure that includes discrete zones of two or more components, where the zones exist at the macroscopic level. Examples include a layer including zones of different components, like a patch work quilt.

The term "ROV" means a remotely operated vehicle (ROV) for working underwater water.

The term "W" means watts.

The term "kW" means kilo watts.

The term "V" means volts.

The term "Ω" means ohms.

The term "m" means meter is distance context.

The term "ft" means feet.

The term "in" means inches.

The term "N" means Newtons.

DETAILED DESCRIPTION OF THE DISCLOSURE

The inventors have found that a hydrate remediation system (HRS) may be constructed that uses electrodes and electric current to heat a section of a flowline between the electrodes. The inventors have found that methods for implementing the HRS include attaching a first electrode to a first location on the flowline or pipeline and a second electrode to a second location on the flowline or pipeline and passing a high amperage electric current through the section of the flowline between the two electrodes for a time sufficient to heat the section to a temperature above a dissociation temperature of hydrates in the section of the flowline. The inventors have found that the HRS of this disclosure may be used to remediate a hydrate blockage in a conventional steel flowline. While the flowline may be preconfigured to interact with the HRS of this disclosure, the systems and methods do not require the flowline to have preexisting electrode and connection points or to have been specially designed to interface with the HRS. In certain embodiments, the flowline may include a plurality of electrodes, where each electrode has a high current connector and where the electrodes are separated by a distance d or length l.

Embodiments of the present disclosure broadly relates to apparatuses comprise at least two subsea electrode assemblies detachably or affixedly attached to a flowline at locations along a length of the flowline so that the electrode assemblies are separated by a distance d or length l, which may be the same or different, defining one or a plurality of flowline sections to be heated. Each electrode assembly includes (a) two clamping members, each of the members has an inner surface and an outer surface, (b) two electrodes, each of the electrodes has an inner surface and an outer surface, (c) two hydraulic chambers, each of the chambers has a hydraulic fluid inlet, and (d) a hydraulically actuated hinge assembly. The hydraulically actuated hinge assembly includes a first arm integral with or attached to one of the clamping members, and a second arm integral with or attached to the other clamping member, where the hinge assembly is pivotally mounted on a pin and mounted on a hydraulic actuator, which opens and closes the members, and a low voltage, high current connector that is adapted to connect the electrodes to a low voltage, high current cable and where the inner surface of each of the electrodes is adapted to form an electrical contact between a metal surface of the flowline at each of the locations so that when a low voltage high current electric input is applied across the flowline sections between two electrodes, the current flow heats the metal of the flowline sections for a time sufficient to dissociate hydrates and/or unplug each of the flowline sections. In other embodiments, the apparatuses further comprise a subsea high current power supply system including (a) a step-down transformer having (i) a high voltage fixed quick disconnect connector disposed on a top of or adjacent to the transformer, (ii) a primary winding that receives a high voltage input, (iii) a secondary winding that produces a low voltage, high current output, and (iv) two high current fixed connectors connected to the secondary winding, where the connectors are disposed on one or more sides of the step-down transformer. The power supply systems also includes two high current cables including high current cable connectors adapted to engage the high current fixed connectors and the high current electrode connectors. In other embodiments, the apparatuses further comprise a vessel based high voltage power supply subsystem including (a) a motor or engine, (b) a generator or alternator, (c) a flying lead, (d) a reel, (e) a high voltage cable including a removable quick disconnect connector, and (f) a matching transformer to match the output of the generator to the input of the high voltage cable if required, where the high voltage cable connects an output of the generator or the matching transformer to the quick disconnect connector of the step down transformer.

Embodiments of the present disclosure broadly relates to apparatuses comprise (A) a subsea high current power supply system including (i) a step-down transformer having (a) a high voltage fixed quick disconnect connector disposed on a top of or adjacent to the transformer, (b) a high voltage, lower current primary winding, (c) a low voltage, high current secondary winding, and (d) two high current fixed connectors connected to the secondary winding, where the connectors are disposed one or more sides of the step-down transformer, and (ii) high current cables including removable high current cable connectors adapted to engage the high current fixed connectors and the high current electrode connectors, and (B) at least two subsea electrode assemblies detachably or affixedly attached to a flowline at locations along a length of the flowline so that the electrode assemblies are separated by a distance d or a separation length l, which may be the same or different, defining one or a plurality of flowline sections to be heated, where each electrode assembly includes (i) two clamping members, each of the members has an inner surface and an outer surface, (ii) two electrodes, each of the electrodes has an inner surface and an outer surface, (iii) two hydraulic chambers, each of the chambers has a hydraulic fluid inlet, (iv) a hydraulically actuated hinge assembly including (a) a first arm integral with or attached to one of the clamping members, and (b) a second arm integral with or attached to the other clamping member, where the hinge assembly is pivotally mounted on a pin and mounted on a hydraulic actuator, which opens and closes the members, and (v) a low voltage, high current connector that is adapted to connect the electrodes to (vi) a low voltage, high current cable, where the inner surface of each of the electrodes is adapted to form an electrical contact between a metal surface at each of the locations so that when a low voltage high current electric input is applied across the flowline sections between the electrodes, the current flow heats the metal of the flowline sections for a time sufficient to dissociate hydrates and/or unplug each of the flowline sections. In other embodiments, the apparatuses further comprise a vessel based high voltage power supply subsystem including (a) a motor or engine, (b) a generator or alternator, (c) a flying lead, (d) a reel, (e) a high voltage cable including a removable quick disconnect connector, and (f) a matching transformer to match the output of the generator to the input of the high voltage cable if required, where the high voltage cable connects an output of the generator or the matching transformer to the quick disconnect connector of the step down transformer.

Embodiments of the present disclosure broadly relates to apparatuses comprise (A) a vessel based high voltage power supply subsystem including (i) a motor or engine, (ii) a generator or alternator, (iii) a flying lead, (iv) a reel, (v) a high voltage cable, and (vi) a matching transformer to match the output of the generator to the input of the high voltage cable if required, (B) a subsea high current power supply system including (i) a step-down transformer having (a) a high voltage fixed quick disconnect connector disposed on a top of or adjacent to the transformer, (b) a high voltage, lower current primary winding, (c) a low voltage, high current secondary winding, and (d) two high current fixed connectors connected to the secondary winding, where the connectors are disposed one or more sides of the step-down transformer, and (ii) high current cables including removable high current cable connectors adapted to engage the high current fixed connectors and the high current electrode connectors, and (iii) at least two subsea electrode assemblies detachably or affixedly attached to a flowline at locations along a length of the flowline so that the electrode assemblies are separated by a distance d or a separation length l, which may be the same or different, defining one or more flowline sections to be heated, where each electrode assembly includes (a) two clamping members, each of the members has an inner surface and an outer surface, (b) two electrodes, each of the electrodes has an inner surface and an outer surface, (c) two hydraulic chambers, each of the chambers has a hydraulic fluid inlet, where each of chambers is defined between the inner surface of each of the clamping members and the outer surface of each of the electrodes, (d) a hydraulically actuated hinge assembly including (1) a first arm integral with or attached to one of the clamping members, and (2) a second arm integral with or attached to the other clamping member, where the hinge assembly is pivotally mounted on a pin and mounted on a hydraulic actuator, which opens and closes the members, and (e) a low voltage, high current connector that is adapted to connect the electrodes to a low voltage, high current cable, where the inner surface of each of the electrodes is adapted to form an electrical contact between a metal surface at each of the locations so that when a low voltage high current electric input is applied across the flowline sections between the electrodes, the current flow heats the metal of the flowline sections for a time sufficient to dissociate hydrates and/or unplug each of the flowline sections.

In the above embodiments, each of the chambers is adapted to receive a hydraulic fluid under pressure via its inlet, where the hydraulic pressure forces each of the inner electrode surfaces into conformity with its corresponding flowline surface to improve a conductivity of the contacts.

In the above embodiments, each of the electrodes comprises a malleable electrically conductive material and each of the electrode assemblies further includes a seal to seal the assembly, where each of the chambers is defined between the inner surface of its clamping member and the outer surface of its electrode, where each of the chambers is adapted to receive a hydraulic fluid under pressure via its inlet, and where the hydraulic pressure forces each of the inner electrode surfaces into conformity with its corresponding flowline surface to improve a conductivity of the contacts.

In the above embodiments, each of the electrodes comprises a malleable electrically conductive material and each electrode assembly further includes a bladder having a hydraulic fluid inlet, where each of the chambers is defined between the inner surface of its clamping member and the outer surface of its electrode and each of the bladders is disposed within each of the chambers, where each of the bladders is adapted to receive a hydraulic fluid under pressure via its inlet, and where the hydraulic pressure forces each of the inner electrode surfaces into conformity with its corresponding flowline surface to improve a conductivity of the contacts. In certain embodiments, each of the bladders comprises a flexible material and is shaped to conform to its corresponding chamber. In other embodiments, the flexible material is rubber.

In the above embodiments, each of the electrodes comprises a hollow structure, where an interior of each of the hollow structures defines its chambers, where each of the hollow structures is adapted to receive a hydraulic fluid under pressure via its inlet, and where the hydraulic pressure forces each of the inner electrode surfaces into conformity with its corresponding flowline surface to improve a conductivity of the contacts.

In the above embodiments, each of the electrodes includes a thin layer deposited on each of the electrode inner surfaces, where each of the layer comprises: (a) a soft electrically conductive material, (b) a paste including a base material and a powdered conductive material, or (c) mixtures and combinations thereof. In certain embodiments, the soft electrically conductive material comprises aluminum, antimony, bismuth, brass, calcium, copper, gallium, gold, indium, lead, magnesium, palladium, platinum, selenium, silver, strontium, tellurium, tin, zinc, or mixtures and combinations thereof. In certain embodiments, the base material comprises a hydrocarbon based oil, a silicone based oil, a hydrocarbon based grease, a silicon based grease, a polymer, an elastomer, a conductive polymer, or mixtures and combinations thereof. In certain embodiments, the powdered conductive material comprises copper, ruthenium, rhodium, palladium, silver, osmium, iridium, platinum, gold, carbon (graphene), annealed copper, gold, aluminum, calcium, tungsten, zinc, nickel, lithium, iron, tin, lead, copper-silver alloys, copper-cadmium alloys, copper-beryllium alloys, copper-chromium alloys, copper-chromium-zirconium alloys, copper-chromium-magnesium alloys, copper-zirconium alloys, copper-nickel alloys, copper-nickel-silicon alloys, copper-nickel-phosphorus alloys, copper-nickel-tin alloys, conductive polymers, or mixtures and combinations thereof.

In the above embodiments, the apparatuses may further include at least one remotely operated vehicle (ROV) to connect and disconnect removable connectors to and from fixed connectors, to position assemblies on the flowlines, or to perform any other subsea operation.

In the above embodiments, the electrodes comprise copper, ruthenium, rhodium, palladium, silver, osmium, iridium, platinum, gold, carbon (graphene), annealed copper, gold, aluminum, calcium, tungsten, zinc, nickel, lithium, iron, tin, lead, copper-silver alloys, copper-cadmium alloys, copper-beryllium alloys, copper-chromium alloys, copper-chromium-zirconium alloys, copper-chromium-magnesium alloys, copper-zirconium alloys, copper-nickel alloys, copper-nickel-silicon alloys, copper-nickel-phosphorus alloys, copper-nickel-tin alloys, conductive polymers, or mixtures and combinations thereof.

Embodiment of the present disclosure also relate to methods including providing an apparatus of this disclosure, attaching each of the electrode assemblies at each of the locations, applying a low voltage, high current input to each of the electrodes and allowing a high current to flow through each of the flowline sections to heat the metal of each of the flowline sections, and continuing the input through each of the flowline sections for a time sufficient for the metal in each of the sections heating each of the flowline sections to dissociate hydrates in and/or unplug hydrate plug from each of the flowline sections.

The principle of operation of the HRS of this disclosure is not new. Water authorities have used electric current to thaw frozen water pipes. Although the principle of operation is known, we do not know of any other hydrate remediation system that uses this principle in an offshore environment—particularly in deep water, where the pipelines and flowlines are less accessible than on land and all operations must be performed remotely. The present disclosure operates with electrode assemblies that are detachably attached to pre-existing flowlines that do not include built in electric heating capability. The electrode surfaces of the electrodes of the electrode assemblies are brought into electrical contact with surface regions of the flowline, where the electrode assemblies and, therefore, the electrodes are separated from each other by a distance d or a length l. One aspect of the electrical contacts at the surface regions of the flowline surrounded by the electrode assemblies is that the contacts have low resistance sufficient to support a high conductivity for a high amperage low voltage current flow through the flowline section defined between the electrodes at a given alternating current frequency. It should also be recognized that all of the subsea components are designed to be installed in sequence, but the exact order of installation is not critical. Moreover, the components may be install simultaneously using multiple booms and ROVs.

The inventors have used a computer model of the system to determine the criteria for correct operation of the HRS of this disclosure to dissociate hydrate plugs in a flowline section. The model system calculates the mechanical power, electrical voltages and currents required to raise the temperature of a section of a flowline of known length and dimensions and with known insulation properties. An example of an application is shown in Table 1. In a particular case, the section of the flowline is 1,000 ft long, has an outside diameter of 6.625 inches, a wall thickness of 0.625 inches and is uninsulated. However, the HRS of this disclosure may be applied to sections of flowlines having other dimensions by adjusting the power output of the engine, the tappings of the transformers, and other variables. Each application will be evaluated and optimized on a case by case basis. In all applications, the electric current passing through the section of the flowline is high, but the voltage required is low. In certain embodiments, the current is between about 500 A and about 6,000 A and the voltage is between about 50 V and about 200 V at an alternating frequency between about 30 Hz and about 100 Hz. In other embodiments, the current is between about 750 A and about 2000 A and the voltage is between about 50 V and about 150 V at an alternating frequency between about 50 Hz and about 100 Hz.

It should be recognized that to remove the coating from a subsea pipeline at a location to attach a subsea electrode of this disclosure, the soil below the location will have to be removed. Generally, the soil removal will be accomplished by vacuuming the soil and dispelling it away from the location. In certain embodiments, the soil removal will be accomplished by vacuuming the soil and dispelling it downstream with regard to the direction of the prevailing ocean currents. Once the trench has been formed under the flowline at the location, the coating removing tool is positioned by an ROV at the location and proceeds to remove the coating. Once the coating is removed, the removing tool is removed by the ROV. Once removed, the process is repeated for the second location. Once the coatings have been removed from both locations, the ROV attaches the electrode assemblies of this disclosure onto the locations and pumps hydraulic fluid into the chambers to improve electrical contact between the inner electrode surface and the outer surface of the cleaned flowline at the locations.

Suitable Materials and Components of the Disclosure

Suitable materials for the subsea electrodes are those having high electrical conductivity, low yield strength, and low hardness. The materials must be sufficiently malleable to conform to, and make good electrical contact with the rough surface of the pipe or flowline when pressed against it. In certain embodiments, the materials include, without limitation, any highly conductive metal and/or any highly conductive material. Exemplary examples of highly conductive metals include, without limitation, copper, ruthenium, rhodium, palladium, silver, osmium, iridium, platinum, gold, carbon (graphene), annealed copper, gold, aluminum, calcium, tungsten, zinc, nickel, lithium, iron, tin, lead, copper-silver alloys, copper-cadmium alloys, copper-beryllium alloys, copper-chromium alloys, copper-chromium-zirconium alloys, copper-chromium-magnesium alloys, copper-zirconium alloys, copper-nickel alloys, copper-nickel-silicon alloys, copper-nickel-phosphorus alloys, copper-nickel-tin alloys, or mixtures and combinations thereof. In certain embodiments, the materials include, without limitation, annealed copper, silver and lead. The electrodes may also be made of a material as described above with a layer of another soft conductive material applied to the surface that contacts the pipe or flowline.

Suitable soft conductive materials include, without limitation, aluminum (Al) (hardness=2–2.9, $\rho=35.0\times10^6$ S/m, ($\sigma=2.82\times10^{-8}$ $\Omega$m), antimony (Sb) (hardness=3.0-3.3, $\rho=2.50\times10^6$ S/m, ($\sigma=41.7\times10^{-8}$ $\Omega$m), bismuth (Bi) (hardness=2.5, $\rho=77.0\times10^6$ S/m, ($\sigma=129\times10^{-8}$ $\Omega$m), brass (hardness=3-4, $\rho=15.9\times10^6$ S/m, (=6.3$\times10^{-8}$ $\Omega$m), bronze (hardness=4, $\rho=7.4\times10^6$ S/m, $\sigma=13.5\times10^{-8}$ $\Omega$m), calcium (Ca) (hardness=1.5, $\rho=7.4\times10^6$ S/m, $\sigma=13.5\times10^{-8}$ m), copper (Cu) (hardness=2.5-3.0, $\rho=58.5\times10^6$ S/m, $\sigma=1.7\times10^{-8}$ $\Omega$m), gallium (Ga) (hardness=1.5, $\rho=7.1\times10^6$ S/m, $\sigma=14\times10^{-8}$ $\Omega$m), gold (Au) (hardness=2.5-3, $\rho=44.2\times10^6$ S/m, ($\sigma=2.3\times10^{-8}$ m), indium (In) (hardness=1.2, $\rho=58.5\times10^6$ S/m, $\sigma=1.7\times10^{-8}$ m), lead (Pb) (hardness=1.5, $\rho=4.7\times10^6$ S/m, $\sigma=21.3\times10^{-8}$ $\Omega$m), magnesium (Mg) (hardness=2.0, $\rho=23.0\times10^6$ S/m, (=43.9$\times10^{-8}$ $\Omega$m), palladium (Pd) (hardness=4.8, $\rho=9.5\times10^6$ S/m, (=10.5$\times10^{-8}$ $\Omega$m), platinum (Pt) (hardness=4.3, $\rho=9.3\times10^6$ S/m, (=10.8$\times10^{-8}$ $\Omega$m), selenium (Se) (hardness=2.0, $\rho$=NA, ($\sigma$=NA), silver (Ag) (hardness=2.5-4, $\rho=62.1\times10^6$ S/m, (=1.6$\times10^{-8}$ $\Omega$m), strontium (St) (hardness=1.8, $\rho=7.7\times10^6$ S/m, ($\sigma=21.3\times10^{-8}$ $\Omega$m), tellurium (Te) (hardness=2.3, $\rho=1.0\times10^4$ S/m, $\sigma=10\times10^{-8}$ $\Omega$m), tin (Sn) (hardness=$\mu$1.5-1.8, =8.7$\times10^6$ S/m, (==11.5$\times10^{-8}$ $\Omega$m), zinc (Zn) (hardness=2.5, $\rho=16.6\times10^6$ S/m, $\sigma=6.0\times10^{-8}$ $\Omega$m), and mixtures and combinations thereof and where the paste comprises a base material and a powdered metal selected from the groups consisting of aluminum, antimony, bismuth, brass, calcium, copper, gallium, gold, indium, lead, magnesium, palladium, platinum, selenium, silver, strontium, tellurium, tin, zinc, alloys thereof, and mixtures and combinations thereof, where each metal has its atomic symbol, hardness, electrical conductivity and electrical resistivity in the parentheticals.

Suitable powdered conductive material include, without limitation, of conductive metals and/or conductive polymeric materials, or mixtures and combinations thereof. Exemplary examples of conductive metals include, without limitation, copper, ruthenium, rhodium, palladium, silver, osmium, iridium, platinum, gold, carbon (graphene), annealed copper, gold, aluminum, calcium, tungsten, zinc, nickel, lithium, iron, tin, lead, copper-silver alloys, copper-cadmium alloys, copper-beryllium alloys, copper-chromium alloys, copper-chromium-zirconium alloys, copper-chromium-magnesium alloys, copper-zirconium alloys, copper-nickel alloys, copper-nickel-silicon alloys, copper-nickel-phosphorus alloys, copper-nickel-tin alloys, conductive polymers, or mixtures and combinations thereof.

Suitable base materials for use in the pastes of this disclosure include, without limitation, hydrocarbon based oils, silicone based oils, hydrocarbon based greases, silicon based greases, polymers, elastomers, conductive polymers, and mixtures or combinations thereof. Exemplary polymers include, without limitation, polyacrylates, polysiloxanes, polyolefins, polyesters, polycarbonates, polyurethanes, copolymers, terpolymers, a multimer polymers, and mixtures or combinations thereof. Exemplary examples of conductive polymers include, without limitation, polypyrrole (PPY), polyaniline (PANI), poly(3,4-ethylenedioxythiophene) (PEDT, PEDOT), polythiophene (PTH), polythiophene-vinylene (PTh-V), poly(2,5-thienylenevinylene) (PTV), poly(3-alkylthiophene) (PAT), poly(p-phenylene) (PPP), poly-p-phenylene-sulphide (PPS), poly(p-phenylenevinylene) (PPV), poly(p-phenylene-terephthalamide) (PPTA), polyacetylene (PAc), poly(isothianaphthene) (PITN), poly($\alpha$-naphthylamine) (PNA), polyazulene (PAZ), polyfuran (PFu), polyisoprene (PIP), polybutadiene (PBD), poly(3-octylthiophnene-3-methylthiophene) (POTMT), poly(p-phenylene-terephthalamide) (PPTA), and mixtures or combinations thereof.

Suitable sensor include, without limitations, temperature sensors, pressure sensors, electrical conductive sensors, optical sensors, IR sensors, sonar sensors, chemical sensors, electrical field sensors, magnetic field sensors, salinity sensors, any other subsea sensor or combinations thereof.

The structural components of the system such as the mud mat, support structures and enclosures shall be made of conventional materials such as structural steel for ease of fabrication. The more highly stressed components such as the pressure-containing half-cylinders that fit around the flowline and the bolts or screws that hold the two halves together shall be made of a high strength alloy steel such as 4130 carbon steel, 5 L×65 steel, or other material with the required minimum specified yield strength.

Hydraulic fittings and couplers are typically made from stainless steels such as 316 L, Inconel or Nitronic materials. Hydraulic seals are made from nitrile-butyl rubber (NBR) or one of the Vitons.

Electrical insulation materials for the subsea cables and main power cable would be specified by the company that designs and manufactures the cables.

DETAILED DESCRIPTION OF DRAWINGS OF THE DISCLOSURE

The HRS of this disclosure includes modules that may be transported by road and loaded onto a support vessel, typically, a remotely operated vehicle (ROV) support vessel at a shore base. In certain embodiments, the vessel includes a crane, a moon pool, two ROV's, and a dynamic positioning system rated at DP2 level or above.

Figure 1:
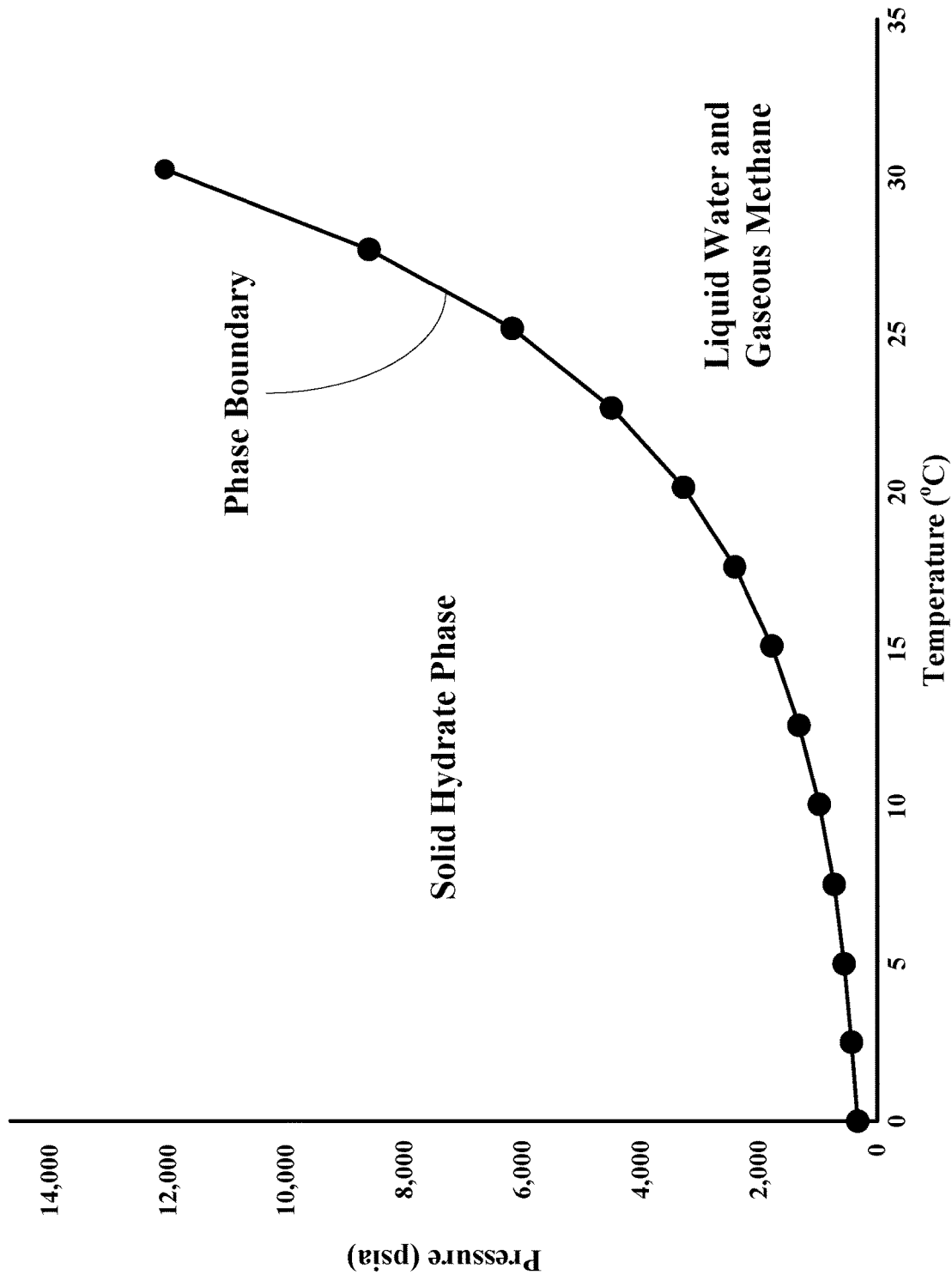
FIG. 1 depicts the general form of a hydrate phase diagram as a function of formation pressure and temperature, showing a solid hydrate phase, a phase boundary line, and a liquid water/gaseous methane phase.
Figure 2:
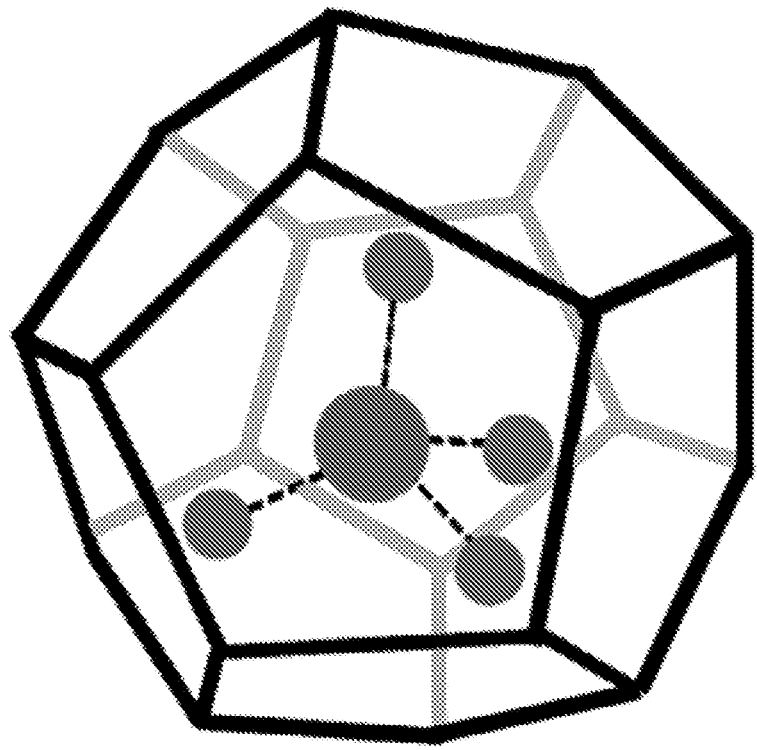
FIG. 2 depicts an illustrative structure of simple methane hydrate.
Figure 3:
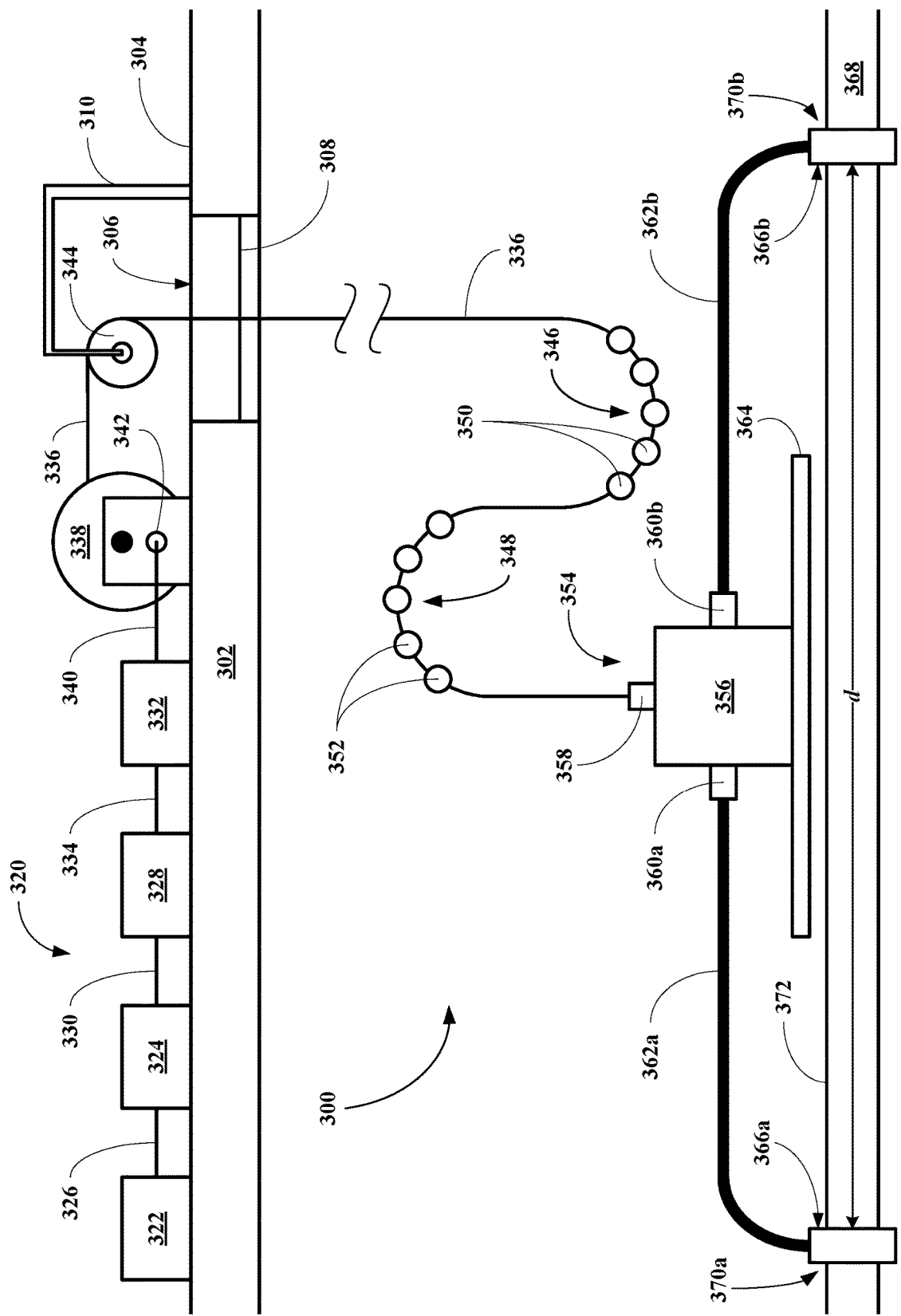
FIG. 3 depicts an embodiment of a system of this disclosure.

Referring to FIG. 3, an embodiment of a hydrate remediation system (HRS) of this disclosure, generally 300, is shown to include a support vessel 302 having a deck 304 and a moon pool 306. The system 300 also includes a vessel-based hydrate remediation subsystem 320. The subsystem 320 includes a fuel tank 322, a diesel engine 324, and a fuel conduit 326 supplying fuel from the tank 322 to the engine 324. The subsystem 320 also includes an electric alternator or generator 328 having an output operably connected to the engine 324 via a drive train 330. In certain embodiments, the alternator output is at least 600 kW. The subsystem 320 also includes a matching transformer 332 connected to the alternator or generator 328 via an alternator output power cable 334, where the output of the transformer 332 is adjusted to match a design voltage of a main power transmission cable 336. In certain embodiments, the transmission cable 336 has a voltage rating of about 10,000 V. The subsystem 320 also includes a powered reel 338 for deploying and retrieving the cable 336. The subsystem 320 also includes a short flying lead 340, which is connected to the reel 338 at a reel connector 342 after the cable 336 is fully deployed. The subsystem 320 also includes a turn-down sheave 344 disposed above the moon pool 306 by a support 310 for lowering the cable 336 below the water level 308.

For clarity, FIG. 3 does not show remotely operated vehicles (ROVs) and their associated equipment, equipment for installing and retrieving the subsea equipment, the control panel, or safety subsystems.

The HRS 300 also includes a distributed ballast subsystem 346 and a distributed buoyancy subsystem 348, if required. The distributed ballast subsystem 346 includes a plurality of ballast units 350. The distributed buoyancy subsystem 348 includes a plurality of buoy units 352. The HRS 300 also includes a subsea step-down transformer subsystem 354. The transformer subsystem 354 includes a subsea step-down transformer 356, a high voltage, quick disconnect assembly 358 connecting the cable 336, and two high current connection assemblies 360a&b. In certain embodiments, the step-down transformer 356 is capable of stepping a high voltage input such as a 10 kV input down a low voltage, high current output such as a 60 V/5,000 A output @ 60 Hz, 100 V/2,000 A output @ 60 Hz, or 120 V/1,120 A output @ 60 Hz. The two high current connection assemblies 360a&b are connected to two high current cables 362a&b having a voltage rating between about 50 V and about 200 V and a current rating between about 500 A and about 6,000 A at an alternating frequency of 30 Hz to 100 Hz and a length between about 200 ft and about 2,500 ft. It should be recognized that the rating and length will depend on many factors and will be chosen on a case-by-case basis. The HRS 300 also includes a subsea foundation 364 such as a mud mat, upon which the transformer subsystem 354 rests. The HRS 300 also includes two high current electrode assemblies 366a&b detachably or fixedly attached to a subsea flowline 368 at two locations 370a&b separated by a distance d and defining a flowline section 372 to be electrically heated, which may be less than or equal to about two times the length of the cables 362a&b.

For clarity, FIG. 3 does not show the equipment for removing the flowline coating and preparing the surfaces for the high current connections. Such equipment is available from Proserv Group Inc. of Great Yarmouth, UK.

An Illustrative Example of an HRS of this Disclosure Based on a 6.625" OD Flowline The data used in this example is taken from a deep water gas field in the Gulf of Mexico that recently had a hydrate blockage. However, unlike the actual field, the flowline was assumed to be uninsulated. The data are listed in Table 1. (The data in Table 1 are taken from an interactive Excel spreadsheet. The input data can be changed and the spreadsheet will recalculate the resulting output data.)

TABLE 1

| HRS Requirements for a 6.625" Flowline | |
|---|---|
| Electrically Heated Pipe | |
| 6.625 in (0.168275 m) | o.d. of pipe |
| 0.625 in (0.015875 m) | w.t. of pipe |
| 5.375 in (0.136525 m) | i.d. of pipe |
| 11.78097 in$^2$ (0.007601 m$^2$) | cross-section area of steel |
| 1.43 × 10$^{-7}$ Ωm | resistivity of steel |
| 1000 ft (304.8 m) | length of pipe to be heated |
| 5.73 × 10$^{-3}$ Ω DC | resistance of pipe (end to end) |
| 20.81 in (0.5287 m) | circumference of pipe |
| 161.13 m$^2$ | surface area of pipe |
| 150 W/m$^2$°K | U-value of bare pipe |
| 42° F. (5.56° C.) | seawater temperature |
| 52° F. (11.11° C.) | desired pipe temperature |
| 5.56° C. | temperature difference |
| 134 kW | power required |
| 1,120 A | amperage required |
| 120 V | voltage required (pipe only) |
| Electric Cable Properties | |
| 2.68 × 10$^{-2}$ Ω | resistance of cable (no greater than) |
| 1.68 × 10$^{-8}$ Ωm | resistivity of copper |
| 1.91 × 10$^{-4}$ m$^2$ | cross-section area of copper |
| 15.61 mm | equivalent diameter of a solid copper rod |
| Subsea Transformer Output | |
| 150 V | voltage required |
| 1,120 A | amperage required |
| 168 kW | power required |
| Subsea Transformer Input | |
| 0.8 | transformer efficiency |
| 210 kW | power required |
| Generator Input | |
| 0.75 | cable efficiency (impedance losses) |
| 280 kW | power required |
| Generator Output | |
| 0.75 | cable efficiency (impedance losses) |
| 373 kW | power required |
| Diesel Engine Power Requirements | |
| 746 W/hp | conversion factor |
| 500 bhp | power required |

The data pertaining to the example given in Table 1 do not include power losses due to stray current leakage. However, we believe the conservative assumptions about the efficiencies of the various components more than compensate for stray current leakage.

A brief description of each component of the system follows:

Diesel Powered Electric Generator

In the example given in Table 1, the diesel powered generator generally has an output of at least 500 kW. More or less power would be required depending upon the diameter of the pipe, its wall thickness, the U-value of its insulation, and the length of the section to be heated. While most generators of this size are 3-phase units, the generator 328 of the HRS 300 of this disclosure may be a single phase or two phase unit. The inventors have identified the following three approaches to provide a suitable generator 328: (a) design and build a single phase generator with the required output characteristics, (b) use a 3-phase unit together with a 3-phase to 2-phase converter, e.g., Scott-T transformer, or (c) use only one phase of an oversized 3-phase generator, i.e., run the unit imbalanced. While any one of these alternatives may be used, in certain embodiments, the generators are 3-phase generators using only a single phase of the 3-phase unit.

The generator or alternator 328 and diesel engine 324 and associated control system, and appurtenances may be skid mounted and packaged to facilitate transportation, handling, and operation in a marine environment.

Matching Transformer

A matching transformer would be required if the output of the available diesel generators did not match the requirements of the main power transmission cable or the other components of the HRS 300.

The Main Power Transmission Cable

The main power transmission cable 336 may be similar to cables currently in service powering down-hole electrical submersible pumps (ESPs) or other subsea installations that require a comparable amount of electric power. ESP cables typically operate at about 10 kV and are capable of carrying about 1 MW of power. While the EPS cables have three conductors, because ESPs have 3-phase motors, the HRS 300 of this disclosure would need to use only two of the conductors. The cable would be designed to have sufficient tensile strength to support its own weight with sufficient margin for dynamic loads as is well known in the art.

In addition to the power cores, the cable may include either fiber optic cores, copper conductors, or combinations thereof for control and data collection and monitoring. If the standard configurations do not include provision for control and data collection and monitoring, the cable may be custom designed to include control and data collection and monitoring conductors.

Electrical Flying Lead

The electrical flying lead 340 connects the source of high voltage electric power, to the powered reel 338. It would be connected to the reel 338 when the main power transmission cable 336 has been deployed and the reel 338 is locked so that it cannot rotate.

Powered Reel

The powered reel 338 may be similar to a unit used to deploy and retrieve a main cable for an ROV cage. The reel 338 would be connected to a power supply only when the reel 338 is stationary and locked to prevent rotation.

Turn-Down Sheave

The turn-down sheave 344 may be a conventional cable sheave. It is suspended above the support vessel moonpool 306 by a suspension/support structure 310 and routes the main power cable 336 from the powered reel 338 down through the vessel moon pool 306 changing the cable's direction from horizontal to vertical. It is capable of supporting the weight of the cable that hangs from it. The reel 338 has a grooved wheel with a radius equal to or greater than the cable's minimum bend radius under load.

Distributed Ballast and Buoyancy Subsystems

The distributed ballast subsystem 346 and the buoyancy subsystem 348 are designed to hold the main cable in a steep-S configuration. The subsystems 346 and 348 will accommodate vertical and horizontal excursions from its position of repose without subjecting the cable 336 or the quick disconnect assembly 358 to excessive stresses and/or strains. It will also allow the quick-disconnect subsystem 358 to hang vertically during installation and retrieval.

In certain embodiments, a simpler configuration may be sufficient depending upon the severity of the metocean conditions at the location, where the work is to be performed and the time of year. The configuration will be chosen on a case-by-case basis.

Quick Disconnect Subsystem

The quick disconnect subsystem 358 is adapted to protect the system from a risk of damage if the support vessel 302 were to move outside its desired watch-circle; for example, if the vessel dynamic positioning (DP) system fails. Such quick connect subsystems 358 are known in the art and any system that reduces damage to the cable 336 and the quick connect subsystems 358 and its components may be used in this disclosure.

Subsea Step-Down Transformer Subsystem

The subsea step-down transformer subsystem 354 includes a single phase transformer 356 mounted in a dielectric oil filled, pressure balanced enclosure as is well known in the art, which is supported on a suitable foundation such as a mud-mat 364. The step-down transformer 356 converts the main supply or high voltage, low current input into a low voltage, high current output. In the example shown above, the main supply voltage and current are approximately 10 kV and 40 A, while the output voltage and current are approximately 120V and 1,120 A at 60 Hz.

The quick disconnect assembly 358 is disposed at the top of or adjacent to the transformer 356 and connects the high voltage electrical supply to the transformer's primary winding.

Two high current connection assemblies 360a&b, one on each side of the transformer 356, connect the transformer's secondary winding to the two high current cables 362a&b.

In certain embodiments, the sealed steel enclosure is filled with a dielectric fluid such as DC200. The enclosure may have a pressure compensating bladder to equalize the internal and external pressure and accommodate changes in a volume of the fluid due to changes in temperature and pressure.

The subsea step-down transformer subsystem 354 also generally includes electrical penetrators connected to or integral with the electrical connectors. In certain embodiments, the transformer subsystem 354 includes a high voltage electrical penetrator integral with an associated high voltage connector. The high voltage electrical connector and associated penetrator are mounted at a top of or adjacent to the enclosure. Two low voltage/high amperage penetrators are integral with the low voltage/high current connectors. The two low voltage/high amperage connectors and their associated low voltage/high amperage penetrators are mounted on one or two sides of the enclosure.

Figure 4:
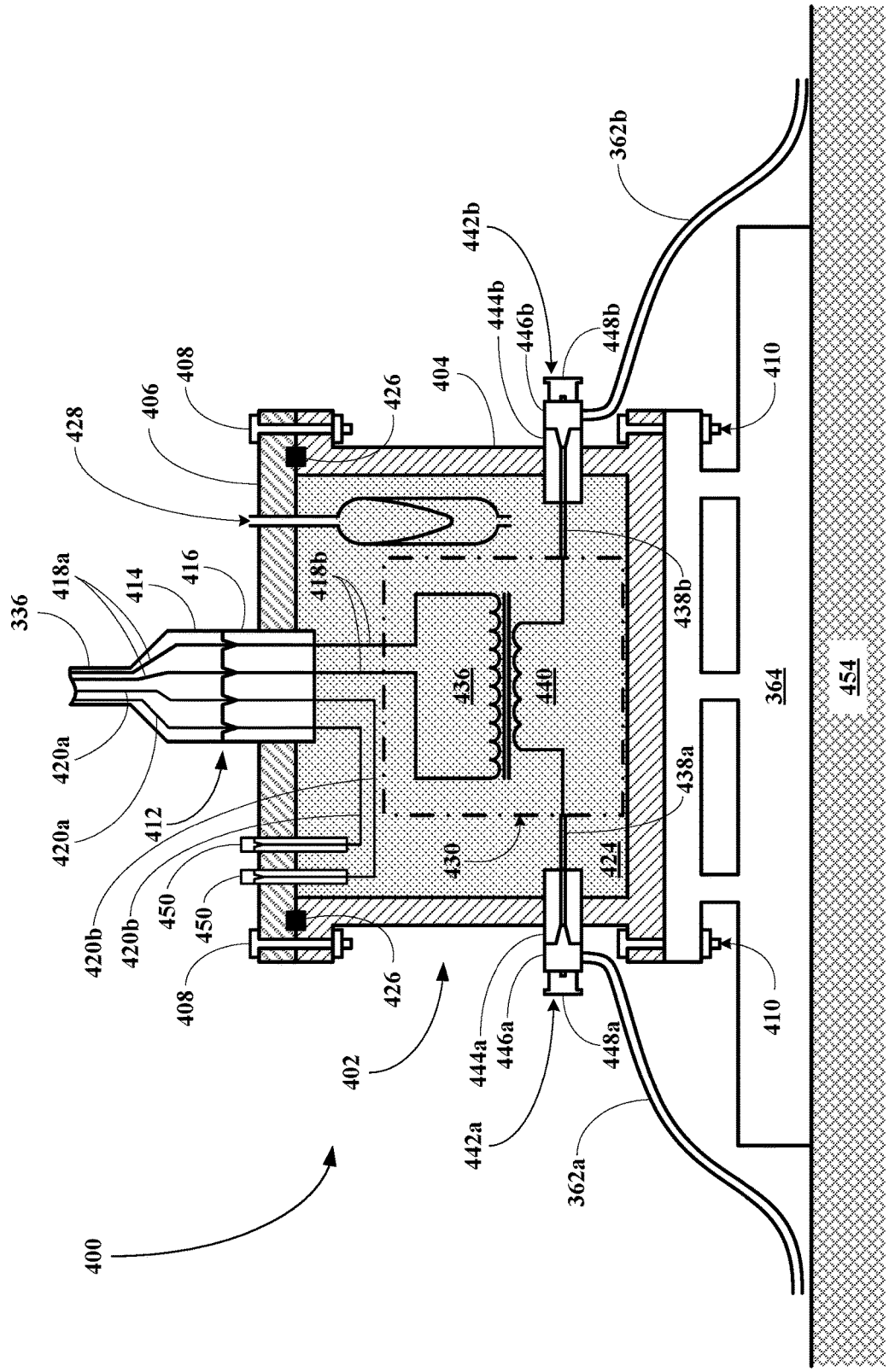
FIG. 4 depicts an embodiment of a subsea step down transformer subsystem of this disclosure.

Referring to FIG. 4, an embodiment of a step-down transformer assembly of this disclosure, generally 400, is shown to include a subsea housing 402 including a body 404 and a lid 406. The lid 406 is attached to the body 404 by connections 408 (shown here as nuts and bolts), while the body 404 is attached to a subsea foundation 364 situated on the sea floor 454 by connectors 410 (shown here as nuts and bolts). The assembly 400 also includes a high-voltage quick connection assembly 412 including a removable cable connector 414 and a fixed housing connector 416. The removable cable connector 414 terminates the cable 336, where the cable 336 and connector 414 includes a pair of high voltage conductors 418a and at least one line bundle 420a (shown here as two line bundles), where each line bundle 420a comprising power supply lines and communication lines, while the housing connector 416 includes a corresponding pair of high voltage conductors 418b and at least one bundle 420b comprising corresponding power supply lines and communication lines. The removable cable connector 414 is designed to detachably engage the fixed housing connector 416 so that the high voltage conductor 418a and the high voltage conductor 418b and the at least one bundle 420a and the at least one bundle 420b disconnect, when an emergency disconnect is required.

The subsea housing 402 comprises a sealed, dielectric filled, pressure balanced enclosure 424 including a seal 426, a pressure equalization apparatus 428, and a step-down transformer 430. The step-down transformer 430 includes a primary winding 436 and a secondary winding 440. The high voltage conductors 418b act as inputs to the primary winding 436, while two high current output conductors 438a&b are connected to the secondary winding 434.

The assembly 400 also includes two high current connection assemblies 442a&b. The high current electrical connection assemblies 442a&b include fixed high current housing connectors 444a&b and removable high current cable connector 446a&b. The removable high current cable connectors 446a&b include ROV control attachments 448a&b. The high current housing connectors 444a&b are the terminuses of the high current output conductors 438a&b and the high current cable connectors 446a&b are proximal terminuses of the high current electric cables 362a&b.

Each bundle 420b terminates in a connector 450. These connectors 450 are separated from the high current connectors 444a&b to reduce, minimize, or eliminate induced interference. Each bundle 420b may serve peripheral electronic devices (e.g., sensors, actuators, electrical devices, mechanical devices, electromechanical devices, etc.) if the latter are required. For example, an application of the HRS may require real time temperature information at one or more points in the system. In such a case, temperature sensors may be integrated with the electrode assemblies 370a&b. Electric power and communications for the sensors may be provided via electrical flying leads connecting the fixed bundle housing connectors 450 to the sensors. Each flying lead includes a removable line bundle connector at each of its ends so that the leads may be manipulated by an ROV to connect the leads between a peripheral electronic device and one of the fixed line bundle connectors 450. Similarly, certain HRS application may require multiple sensors and/or devices serviceable from a control hub, where an ROV would be used to connect a flying lead between one of the fixed line bundle connectors 450 and the hub and then other fly leads between the hub and sensors and/or devices.

Mud Mat

In certain embodiments where a seabed is soft such as in the Gulf of Mexico, the transformer subsystems 354 of this disclosure may also include a foundation 364 such as a mud mat or suction pile on which to mount the subsea transformer subsystems 354. In certain embodiments, the subsea foundation or mud mat 364 is a fabricated steel mat. The design of the foundation depends upon the applied loads and the load bearing characteristics of the seabed. Therefore, in certain embodiments, soil samples are obtained and analyzed. If the samples indicate that a foundation is needed, then a foundation is designed and deployed to accommodate the seabed.

High Current Electrical Connections and Connectors

Figure 5B:
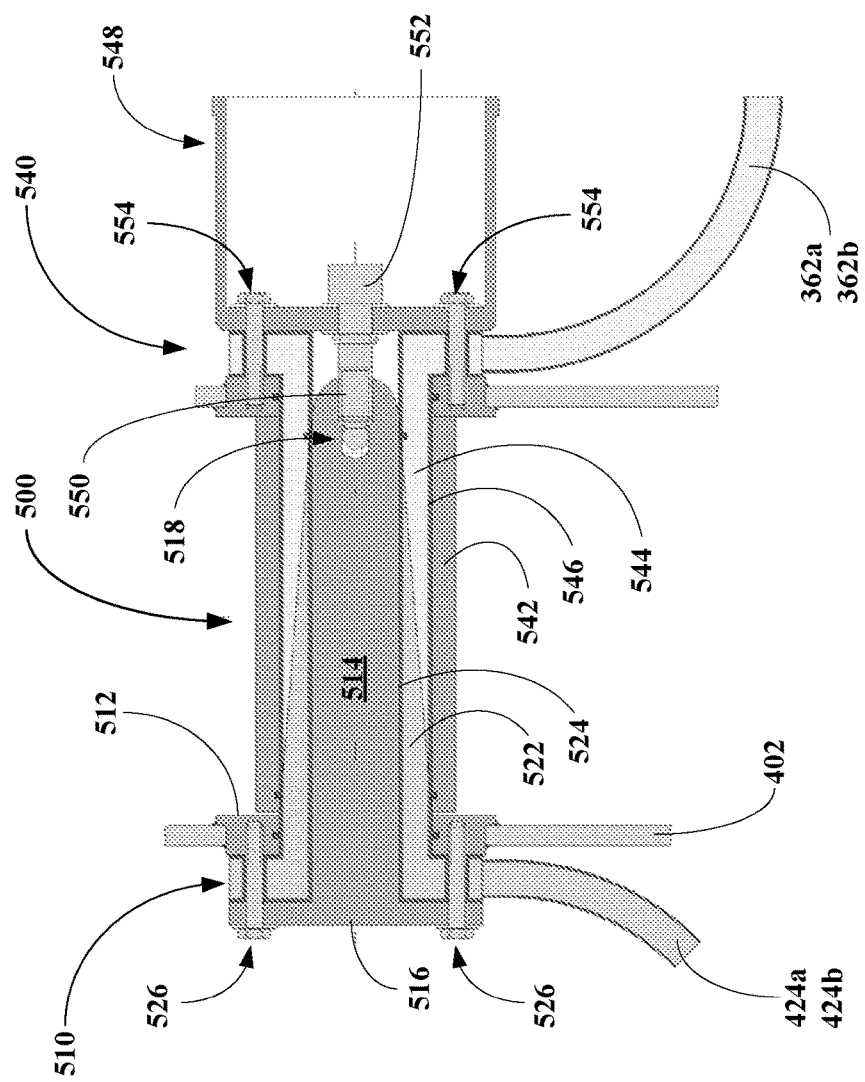

Embodiments of the high current electrical connection assemblies 360A&B are shown in FIGS. 5A and 5B. The high current electrical connections, generally 500, are installed and secured by an ROV using a torque tool. Generally, each high current electrical connection has a standard ROV interface or "bucket" that the ROV latches to. The bucket and connector have a common axis. The ROV engages and latches to the bucket, carries the removable part of the connector into position, and then engages and latches it to the fixed part of the connector. The connector's latch is operated by a ROV torque tool, which engages a profile in the bucket.

Looking now specifically to FIGS. 5A&B, an opened view and a closed view of an embodiment of a high current connection assembly, generally 500, is shown to include a male high current connector 510 and a female high current connector 540. In this configuration, the male connector 510 is also known as the fixed part of the connection assembly 500, while the female connector 540 is also known as the removable part of the connection assembly 500. It should be recognized that this configuration may be reversed, with the female connector 540 being the fixed part and the male connector 510 being the removable part.

The male connector 510 includes a housing fitting 512 integrated into the housing 402 of the transformer 400. The male connector 510 also includes a metal cylindrical load bearing member 514 having a proximal flange 516 and a threaded female profile 518 in its distal end 520. The male connector 510 further includes a conducting member 522 and an insulating member 524, where the insulating member 524 is interposed between the load bearing member 514 and the conducting member 522. The electrically insulating member 524 is adapted to ensure that the conducting member 522 does not come into direct contact with the load-bearing member 514 of the male connector 510. The conducting member 522 is connected to, or integral with, the cable 438a or 438b, which is in turn connected to the secondary winding 440 of the transformer 430. The flange 516 is connected to the fitting 512 by connections 526 here shown as threaded bolts or screws and threaded receiving apertures. The male connector 510 also includes an o-ring 528 for sealing the fitting 512 against the insulating member 524.

The female connector 540 includes an outer cylindrical metal load bearing member 542, an inner conducting member 544, an insulating member 546 and an ROV connector 548 including a threaded male member 550 and an ROV hub 552. The load bearing member 542 is attached to the ROV connector 548 by connections 554 shown here as threaded bolts or screws and threaded receiving apertures. As in the male connector, the insulating member 546 is adapted to ensure that the conducting member 544 does not come into direct contact with the load-bearing member 542 of the female connector 540. The inner conducting member 544 is connected to or integral with the cable 362a or 362b. The female connector 540 also includes a first o-ring 556 for sealing the load bearing member 542 against the insulating member 546 at its proximal end. The female connector 540 also includes a second o-ring 558 for maintaining the continuity of the insulating members 524 and 546 as the insulating o-ring 558 and the two insulating member 524 and 546 act to insulate the electrodes 522 and 544 from the load bearing members 514 and 542, when the female connector 540 engages the male connector 510. The female connector 540 also includes a third o-ring 560 for sealing the load bearing member 514 against the insulating member 546 at its distal end. The female connector 540 also includes an electrically insulating bleed line 562 connected to a flexible bladder 564 so that salt water is not trapped between the o-rings 558 and 560.

Heating Rate and Variable Controlling the Heating Rate

The heating rate of a pipe between two electrodes is a function of the diameter D of the pipe, the length l or distance d between the electrodes, the current I passing between the electrodes, the voltage V across the electrodes, and the frequency of the alternating current f. Value ranges for some of these variable are listed in Table 2.

TABLE 2

Variable and Values

| Variable | Range |
| --- | --- |
| D | about 4" to about 12" or any narrower range |
| l | about 200 ft to about 2,500 ft or any narrower range |
| I | about 500 A to about 6,000 A or any narrower range |
| V | about 50 V to about 200 V or any narrower range |
| f | about 30 Hz to about 100 Hz or any narrower range |

In certain embodiments, D is between about 4" to about 10" or between about 4" to about 8"; l is about 500 ft to about 2,000 ft or about 750 ft to about 1,500 ft; I is about 750 A to about 6,000 A or about 750 A to about 5,000 or about 750 A to about 4,000 or about 750 A to about 3,000 or about 750 A to about 2,000; V is about 50 V to about 150 V or about 100V or about 150 V; and f is about 40 Hz to about 100 Hz or about 50 Hz to about 80 Hz.

Some of the variables are related as follows: as the diameter D increases, the current I required to heat at the same rate goes up, all other variables held constant; a length l does down, the voltage V required to heat at the same rate goes down, all other variable held constant. In most situation, the effective depth or skin depth is about 0.78 mm.

The skin depth of a steel flow line may be approximated by the following formula, which is a simplification of a more complex equation for calculating skin depth, but is sufficient for the analyses performed herein:

$$\delta = \sqrt{\frac{2\rho}{(2\pi f)(\mu_0 \mu_r)}} \approx 503 \sqrt{\frac{\rho}{\mu_r f}}$$

where $\mu_0 = 1.26 \times 10^{-6}$ N/A² (magnetic permeability of free space), $\mu = 1,000$ N/A² (relative magnetic permeability of API 5 L Steel), $\rho = 1.43 \times 10^{-7}$ Ωm (resistivity of the conductor), f=60 Hz (frequency of the alternating current), and $\delta = 7.77 \times 10^{-4}$ m or 0.777 mm (skin depth or the depth at which J has fallen to e/e of Js).

The resistance of a steel flow line may be approximated using the following formula:

$$R \approx \frac{L\rho}{\pi(D-\delta)\delta}$$

where D=0.068275 m or 6.625 in (outside diameter of conductor), $\delta = 7.77 \times 10^{-4}$ m (skin depth), $\rho = 1.43 \times 10^{-7}$ Ωm (resistivity of the conductor), L=304.8 m (length of pipe), and R=0.107Ω (effective resistance of pipe @ 60 Hz).

High Current Cable Connectors and High Current Cables

In certain embodiments, the two high current cables 362a&b have a length l between about 200 ft and about 2500 ft. In other embodiments, the length l of the high current cable is between about 400 ft and about 1,500 ft. In other embodiments, the length l of the high current cable is between about 800 ft and about 1,200 ft. In certain embodiments, a total cross-sectional area of a copper conductor in the cable is the equivalent of a cross-sectional area of a solid copper rod having a diameter between about 0.5" (12.7 mm) and about 2" (50.8 mm). In other embodiments, the total cross-sectional area of a copper conductor in the cable is the equivalent of a cross-sectional area of a solid copper rod having a diameter between about 0.75" (19.1 mm) and about 1.5" (38.1 mm). In other embodiments, the total cross-sectional area of a copper conductor in the cable is the equivalent of a cross-sectional area of a solid copper rod having a diameter between about 1¼" (31.75 mm) and about 1.5" (38.1 mm). In other embodiments, the total cross-sectional area of a copper conductor in the cable is the equivalent of a cross-sectional area of a solid copper rod having a diameter between 1⅜" (34.925 mm) and about 2" (50.8 mm). In certain embodiments, the cable comprises solid conductors. In other embodiments, to improve flexibility, the high current cables are stranded. In other embodiments, a diameter of the strands and the number of strands will be designed to have a desired flexibility and current carrying capacity. Of course, it should be recognized that the length and diameter of the cables will be optimized on a case by case basis.

Connections to the Steel Flowline

The connections to the steel flowline are the most critical parts of the system. The electrical resistance of each connection would need to be low, not only to minimize the restriction to the flow of current, but also to minimize the risk of overheating the connection. In round numbers, if the contact resistance at a connection was 0.0001Ω and the current flowing through it was 5,000 A, the amount of heat generated at the contact would be 2.5 kW.

Two things are required to achieve a good connection to the pipe: first, removing the pipe coating or insulation to expose a clean, bare steel surface, and second making a low resistance metal to metal electrical contact with the cleaned steel surface. These two steps must be accomplished without compromising the mechanical integrity of the pipe or flowline.

Referring to FIG. 6A, an opened view of an embodiment of a high current electrode assembly, generally 600, is shown to include a hinge assembly 602 including a pin 604, a first arm 606, and a second arm 608. The first arm 606 is integral with, detachably connected to, or affixed to a first semi-cylindrical clamping member 610. The first member 610 includes a first proximal flange 612, a first distal flange 614, and a first member inner surface 616. The first arm 606 is pivotally mounted via a first arm pin 606a to an outer sleeve 618 of a hydraulic actuator 620 including an actuator rod 621 as shown in FIG. 6B. The second arm 608 is integral with, detachably connected to, or affixed to a second semi-cylindrical clamping member 622. The second member 622 includes a second proximal flange 624, a second distal flange 626, and a second member inner surface 628. The second arm 608 is pivotally mounted to an end 630 of the hydraulic actuator rod 621 via a second arm pin 608a.

The assembly 600 also includes a first semi-cylindrical electrode 632 having a first electrode proximal flange 634, a first electrode distal flange 636, a first electrode outer surface 638, and a first electrode inner surface 640. The assembly 600 also includes a second semi-cylindrical electrode 642 having a second electrode proximal flange 644, a second electrode distal flange 646, a second electrode outer surface 648, and a second electrode inner surface 650.

The assembly 600 also include a first hydraulic fluid chamber 652 and a first hydraulic fluid input 654, where the first chamber 652 is defined between the first member inner surface 616 and the first electrode outer surface 638. The assembly 600 also includes a second hydraulic fluid chamber 656 and a second hydraulic fluid input 658, where the second chamber 656 is defined between the second member inner surface 628 and the second electrode outer surface 648.

The assembly 600 also includes a first elastomeric seal 660 disposed between the first semi-cylindrical clamping member 610 and the first semi-cylindrical electrode 632 and adapted to isolate the first hydraulic fluid chamber 652 and ensures that the chamber 652 is capable of containing an elevated pressure without leakage. The assembly 600 also includes a second elastomeric seal 662 disposed between the second semi-cylindrical clamping member 622 and the second semi-cylindrical electrode 642 and adapted to isolate the second hydraulic fluid chamber 656 and ensures that the chamber 656 is capable of containing an elevated pressure without leakage. The elastomeric seals 660 and 662 are in the form of continuous loops that occupy grooves 664 and 666 in the clamping members 610 and 622 that run longitudinally down the distal flanges 614 and 626, circumferentially around first ends 668 and 670 of the clamping members 610 and 622, longitudinally up the proximal flanges 612 and 624 and circumferentially around second ends 672 and 674 of the clamping members 610 and 622 as shown more clearly in FIG. 6F.

The proximal flanges 612 and 624 and the distal flanges 614 and 626 include connections 676 including bores 678, threaded bores 679, and engaging members 680, here the connections 676 are shown as threaded bores and threaded bolts. The connections 676 also include washers 682 and retaining friction rings 684 of plastic material such as nylon. The rings 684 provide sufficient friction to retain the threaded bolts 680 in their bores 678 when the assembly 600 is being handled and installed but allow the ROV's tool to turn the bolts and engage their associated the threaded bores 678.

The hydraulic actuator 620 holds the assembly open while an ROV guides the assembly 600 into the required position and orientation on the flowline so that the heads of the threaded bolts 680 are oriented upwards and accessible. The actuator 620 then closes the assembly 600 around a flowline 686 having an outer surface 688 and an interior 690 as shown in FIG. 6B. The ROV operates the hydraulic actuator 620 which closes the high current electrode assembly 600 around the flowline 686. The ROV supplies the hydraulic pressure for operating and controlling the hydraulic actuator 620 and other hydraulic functions via flexible hoses and hot-stab connections (omitted from FIGS. 6A&B for clarity). When the assembly 600 is in position and closed around the flowline 688, the ROV engages and tightens the connections 676 (generally bolts) in a prescribed sequence and to prescribed torques to minimize distortion and ensure, as far as possible, uniform distribution of clamping force around the flowline 686. Note that there is sufficient clearance between the pin 604 and the bores in the arms 606 and 608 to ensure that the hinge assembly 602 does not resist the clamping force provided by the connections 676.

When the assembly 600 is clamped around the flowline 686, the ROV de-energizes the hydraulic actuator 620 and directs hydraulic pressure to the two hydraulic fluid chambers 652 and 656 concurrently via flexible hoses and hot-stabs through the hydraulic inputs 654 and 658 forcing the electrodes 632 and 642 against the outer surface 688 of the flowline 686, thus ensuring that the inner surfaces 640 and 650 make good electrical contact with the outer surface 688 of the flowline 686.

The electrodes 632 and 642, as shown in FIG. 6C, include thick end portions 692a and 692b that are connected to one of the high current cables 360a or 360b via a clamping connector 694 and a corresponding cable connector 696 so that current flows from the step-down transformer 356 through the cables 362a or 362b through the flowline section 372 between the two pairs of electrode assemblies 366a and 366b or 500 to electrically heat the flowline section 372 and its interior.

The hydraulic pressure in the chambers 652 and 656 force the electrodes 632 and 642 against the outer surface 688 of the flowline 686. The electrodes 632 and 642 are made of a malleable material so that they can deform and conform to the surface 688 of the flowline 686 including any small irregularities in the surface 688. The flowline 686 is made from steel pipe, which does not generally have a smooth machined surface. Its surface will normally have been sand-blasted and will have microscopic pits, peaks, and valleys.

Referring to FIGS. 6D&E, an alternative configuration of a high current electrode assembly 600 of FIG. 6B includes bladders 698a&b filling the chambers 652 and 656 and having inlets 699a&b. In this configuration, the hydraulic fluid is pumped into the bladders 698a&b instead of the chambers 652 and 656 to force the electrodes 632 and 642 to deform and conform to the flowline surface 688. Additionally, in this configuration, the assembly 600 may omit the seals 660 and 662 and grooves 664 and 666.

Referring to FIGS. 6F, a perspective view of the flowline 686 and the assembly 600 of FIGS. 6A-C is shown. The view is designed to illustrate the actual structure of seals 660 and 662 and grooves 664 and 666.

Contact Pressure and Conductivity

Referring to FIG. 7A, when the surface 640 of the electrode 632 and the surface 650 of the electrode 642 come into contact with the rough steel surface 688 of the flowline 686, then electrical contact is believed to be confined to contact points or areas 702, where the surfaces 640 and 650 of the electrodes 632 and 642 make contact with the peaks 704 on the surface 688 of the flowline 686. In this figure, an electrical current flowing from the electrode 632 or 642 into the flowline 686 is constricted to flow through these small points or areas 702 of contact resulting in a relatively high electrical resistance.

Referring to FIG. 7B, when the surface 640 of the electrode 632 and the surface 650 of the electrode 642 and the rough steel are pressed together, the softer material of the electrode 632 or 642 yields and deforms to form deformed contact areas 706 of the electrode 632 or 642 conforming to the peaks 704 of the rough steel surface 688 of the flowline 686 increasing the areas of electrical contact. In the figure, an electrical current flowing from the electrode 632 or 642 into the flowline 686 would now be less constricted and the electrical resistance would be lowered. If the electrode 632 or 642 include a soft metal layer, then the soft metal layer would be the material that deforms and conforms to the peaks 704.

The graph of FIG. 8 shows the electrical resistance of the contact between samples of soft drawn copper and steel as a function of the force pressing them together, as pressure increases, resistance goes down and eventually levels out.

Alternate Electrode Designs

Bladders and Soft Metal Semi-cylindrical

Referring to FIG. 9A, another embodiment of a high current electrode assembly, generally 900, is shown to include a first semi-cylindrical clamping member 902 including a first member proximal flange 904, a first member distal flange 906, and a first member inner surface 908. The assembly 900 also includes a second semi-cylindrical clamping member 910 including a second member proximal flange 912, a second member distal flange 914, and a second member inner surface 916.

The assembly 900 also includes a first semi-cylindrical electrode 918 including a first electrode proximal flange 920, a first electrode distal flange 922, a first electrode inner surface 924, and a first electrode outer surface 926. The assembly 900 also includes a second semi-cylindrical electrode 928 including a second electrode proximal flange 930, a second electrode distal flange 932, a second electrode inner surface 934, and a second electrode outer surface 936.

The assembly 900 also includes a first semi-cylindrical soft conductive member 938 including a first soft conductive member proximal flange 940, a first soft conductive member distal flange 942, and an first conductive member inner surface 944. The assembly 900 also includes a second semi-cylindrical soft conductive member 946 including a second soft conductive member proximal flange 948, a second soft conductive member distal flange 950, and a second soft conductive member inner surface 952.

The assembly 900 also includes a first chamber 954 defined between the first member inner surface 908 and the first electrode outer surface 926, and a first inlet 956, and a first hydraulic fluid bladder 958 having a first bladder inlet 960. The assembly 900 also includes a second chamber 962 defined between the second member inner surface 916 and the second electrode outer surface 936, and including a second inlet 964, and a second hydraulic fluid bladder 966 having a second bladder inlet 968. The assembly 900 is clamped to a flowline 970 having a flowline outer surface 972, and a flowline interior 974 and connections 976 (generally bolts) are tightened down in a prescribed order. The soft conducting members 938 and 946 engage the outer surface 972 of the flowline 970. Hydraulic fluid is then pumped into the bladders 958 and 966 forcing the soft conducting inner surfaces 944 and 952 into electrical contact with the outer surface 972 of the flowline 970.

Soft Metal Layers

Figure 9B:
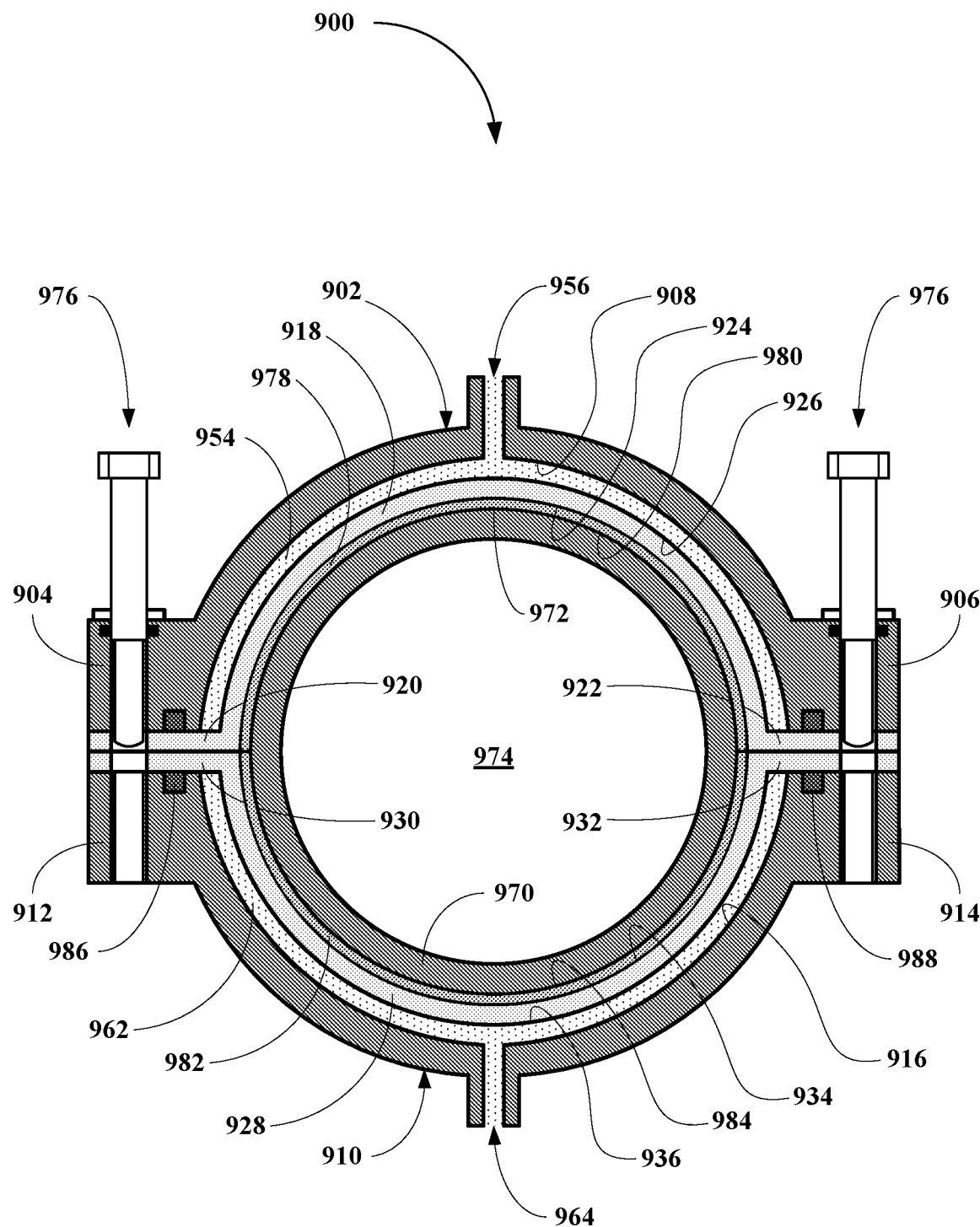

Referring to FIG. 9B, another embodiment of a high current electrode assembly, generally 900, is shown to include the first semi-cylindrical clamping member 902 including the first member proximal flange 904, the first member distal flange 906, and the first member inner surface 908. The assembly 900 also includes the second semi-cylindrical clamping member 910 including the second member proximal flange 912, the second member distal flange 914, and the second member inner surface 916.

The assembly 900 also includes the first semi-cylindrical electrode 918 including the first electrode proximal flange 920, the first electrode distal flange 922, the first electrode inner surface 924, and the first electrode outer surface 926. The assembly 900 also includes the second semi-cylindrical electrode 928 including the second electrode proximal flange 930, the second electrode distal flange 932, the second electrode inner surface 934, and the second electrode outer surface 936.

The assembly 900 also includes a first semicircular soft conductive layer 978 deposited onto the first electrode inner surface 924 and having a first conductive layer inner surface 980. The assembly 900 also includes a second semicircular soft conductive layer 982 deposited on the second electrode inner surface 934 and having a second soft conductive layer inner surface 984.

The assembly 900 also includes the first hydraulic fluid chamber 954 defined between the first member inner surface 908 and the first electrode outer surface 924, and the first hydraulic fluid inlet 956. The assembly 900 also includes the second hydraulic fluid chamber 960 defined between the second member inner surface 916 and the second electrode outer surface 936, and the second hydraulic fluid inlet 962.

The assembly 900 is clamped to the flowline 970 having the flowline outer surface 972, and the flowline interior 974. When the assembly 900 is in position on the flowline 970, the ROV energizes the hydraulic actuator, and thus clamps the assembly 900 around the flowline 970. The ROV then engages the connections (bolts), but does not tighten them. The connections (bolts) are then tightened in a predetermined sequence to a predetermined torque values. The soft conducting members 978 and 982 engage the outer surface 972 of the flowline 970. The hydraulic fluid is then pumped into the chambers 954 and 962 forcing the soft conducting inner surfaces 980 and 984 into electrical contact with the outer surface 972 of the flowline 970. The assembly 900 also includes seals 986 and grooves 988.

Hollow Metal Electrodes Including Hydraulic Chambers

Referring to FIG. 10A, another embodiment of a high current electrode assembly, generally 1000, is shown to include a first semi-cylindrical clamping member 1002 including a first member proximal flange 1004, a first member distal flange 1006, and a first member inner surface 1008. The assembly 1000 also includes a second semi-cylindrical clamping member 1010 including a second member proximal flange 1012, a second member distal flange 1014, and a second member inner surface 1016. The assembly 1000 also includes a first semi-cylindrical hollow electrode 1018 including a first electrode proximal flange 1020, a first electrode distal flange 1022, a first electrode inner surface 1024, a first electrode outer surface 1026, a first electrode hydraulic fluid interior chamber 1028, and a first electrode hydraulic fluid inlet 1030. The assembly 1000 also includes a second semi-cylindrical hollow electrode 1032 including a second electrode proximal flange 1034, a second electrode distal flange 1036, a second electrode inner surface 1038, a second electrode outer surface 1040, a second electrode hydraulic fluid interior chamber 1042, and a second electrode hydraulic fluid inlet 1044. The assembly 1000 is clamped to a flowline 1046 having a flowline outer surface 1048, and a flowline interior 1050 and connections 1052 (generally bolts) are tightened down in a sequence to produce a sufficient clamping force. The inner surfaces 1024 and 1038 engage the outer surface 1048 of the flowline 1046. Hydraulic fluid may then be pumped into the chambers 1028 and 1042 via the inlets 1030 and 1044 forcing the inner surfaces 1024 and 1038 onto the outer surface 1048 of the flowline 1046 decreasing electrical resistance and increasing electric conductivity of the contact surfaces between the electrodes and the surface 1048 of the flowline 1046.

Hollow Metal Electrodes Including Hydraulic Chambers and Soft Metal Layers

Figure 10B:
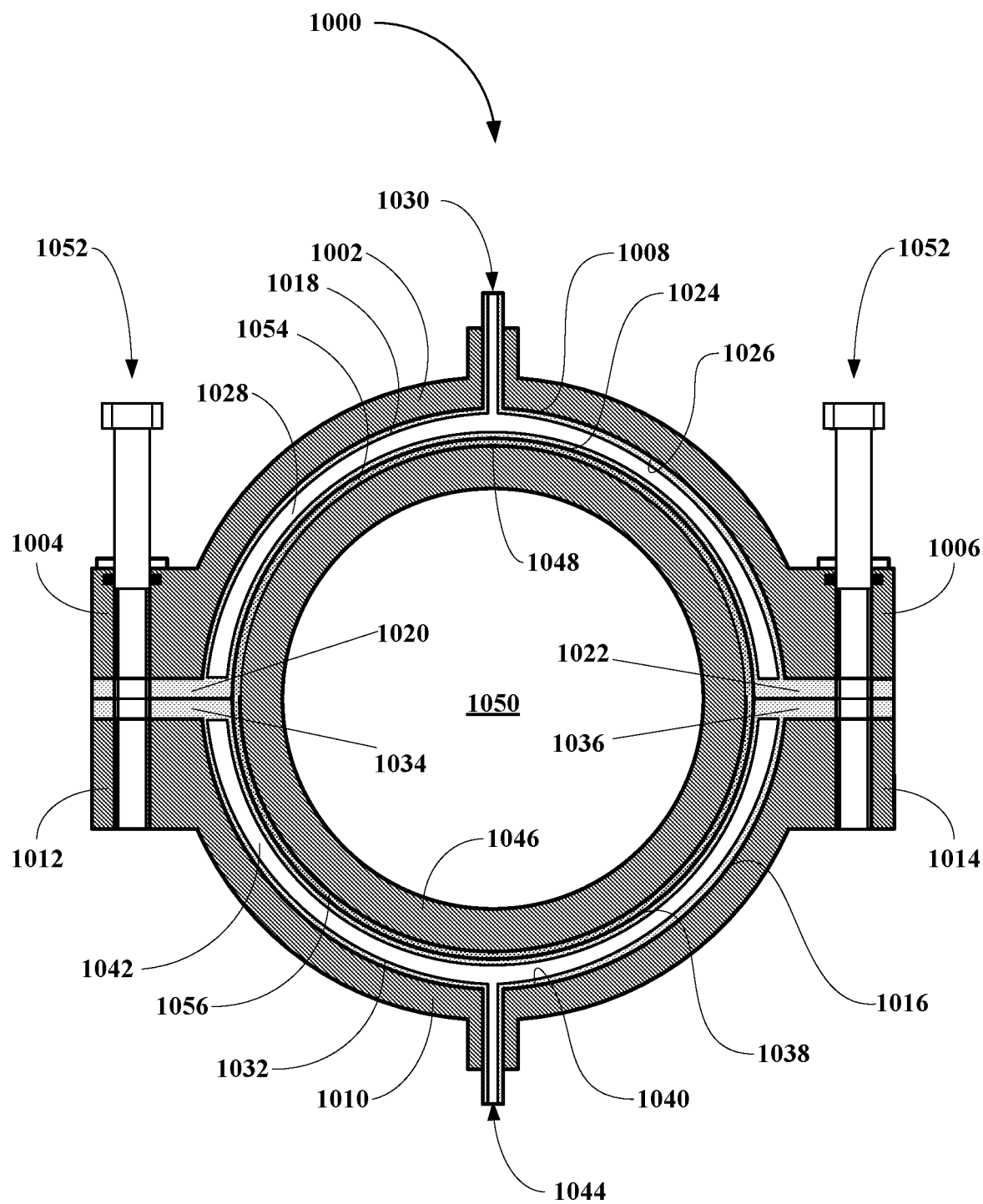

Referring to FIG. 10B, another embodiment of a high current electrode assembly, generally 1000, is shown to include the first semi-cylindrical clamping member 1002 including a first member proximal flange 1004, the first member distal flange 1006, and a first member inner surface 1008. The assembly 1000 also includes the second semi-cylindrical clamping member 1010 including the second member proximal flange 1012, the second member distal flange 1014, and the second member inner surface 1016. The assembly 1000 also includes the first semi-cylindrical hollow electrode 1018 including the first electrode proximal flange 1020, the first electrode distal flange 1022, the first electrode inner surface 1024, the first electrode outer surface 1026, the first electrode hydraulic fluid interior chamber 1028, and the first electrode hydraulic fluid inlet 1030. The assembly 1000 also includes a second semi-cylindrical hollow electrode 1032 including a second electrode proximal flange 1034, a second electrode distal flange 1036, a second electrode inner surface 1038, a second electrode outer surface 1040, a second electrode hydraulic fluid chamber 1042, and a second electrode hydraulic fluid inlet 1044. The assembly 1000 also includes a first soft conductive layer 1054 deposited on the inner surface 1024 of the first electrode 1018. The assembly 1000 also includes a second soft conductive layer 1056 deposited on the inner surface 1038 of the second electrode 1032. The assembly 1000 is clamped to a flowline 1046 having a flowline outer surface 1048, and a flowline interior 1050 and connections 1052 (generally bolts) are tightened down in a sequence to produce a sufficient clamping force. The soft conducting layers 1054 and 1056 engage the outer surface 1048 of the flowline 1046. Hydraulic fluid may then be pumped into the chambers 1028 and 1042 via the inlets 1030 and 1044 forcing the soft layers 1054 and 1056 into electrical contact with the outer surface 1048 of the flowline 1046 decreasing electrical resistance and increasing electric conductivity into the flowline 1046.

Removal of the Pipe Coating

The inventors have identified a method of removing coatings on deep water pipe lines or flowlines using a flowline coating removal tool such as the tool available from Proserv Group Inc.

Low Resistance Metal to Metal Electrical Contact

The electrical resistance of a metal to metal contact decreases as a force pressing the two surfaces together increases. Even if the two surfaces appear to be smooth, at a microscopic level, they are rough and make contact only at the peaks of their irregularities. The electric current flowing from one surface to the other is constricted to flow through these microscopic points of contact as shown in FIGS. 7A&B.

As the pressure compressing the surfaces together increases, the softer material yields and conforms to the irregularities in the surface of the harder material. As the softer material yields, the areas of the points of contact grow and the electric current is less constricted. In the case of a copper to steel connection, the copper yields more than the steel. The relationship between pressure and contact resistance is shown in FIG. 8.

Note that, in the example shown in Table 1 supra, if the length of the electrode is the same as the diameter of the pipe (6⅝"), and if the contact pressure was 3,000 psi, the contact resistance would be approximately 0.0000000Ω. This would be satisfactory for the effective operation of the HRS with a comfortable margin.

To achieve a uniform pressure between the copper conductor and the steel pipe, the tool of this disclosure will use hydraulic pressure supplied, for example, by the ROV's hydraulic power unit. The diagram shown in FIGS. 7A&B illustrate the principal conceptually.

The proposed tool will consist of a split clam-shell cylinder with sufficient strength to contain the desired hydraulic pressure—for example, 3,000 psi. The two halves of the clamshell would be held together by a loose hinge. A simple mechanism such as a linkage with a hydraulic actuator would hold the clamshell open during installation. The clamshell would be lowered from the support vessel by the usual means e.g., a heave compensated winch, crane or chain-buoyancy arrangement. An ROV would guide the tool into position around the pipe and then operate the mechanism to close the clamshell around the previously prepared pipe. The ROV would then use a hydraulically powered socket wrench to engage, but not tighten, an arrangement of threaded fasteners that are temporarily retained by friction rings in lengthwise flanges along each side of one half of the clamshell. The threaded fasteners would engage threaded holes in lengthwise flanges along each side of the other half of the clamshell. Having engaged all of the threaded fasteners, the ROV would then tighten them to the required torque(s) in a specified sequence.

Each half of the clamshell is lined with copper such that there is a small space between its cylindrical surface and the copper; however, the copper is in contact with the clamshells' flanges. The copper may be brazed to or welded to the flanges or attached to them by some other means. In the latter case, there would be an elastomeric seal to isolate the gap from the outside. Each half of the clamshell has a hydraulic port with fittings and a hydraulic hose so that hydraulic fluid can be supplied to the small space between the copper and the steel shell.

When the clamshell is set in position and the threaded fasteners (generally bolts) have been tightened to the specified torque, the ROV will be used to supply hydraulic pressure to the small space between the copper and the steel shell via the ports. Each half of the system would previously have been connected together with flexible hydraulic hose so that pressure would be applied to both halves concurrently.

The hydraulic pressure would act upon the copper which, being malleable, would yield and conform to the outer surface of the steel flowline. As mentioned above, the electrical contact resistance between the surfaces of the copper and the steel is a function of the contact pressure. Thus, the contact resistance is reduced by the application of hydraulic pressure.

REFERENCES SITED IN THE DISCLOSURE

The following references were cited in this disclosure:

1. Internet article, *Why are Gas Hydrates Important?* Centre for Gas Hydrate Research, Herriot Watt University (Picture from Petrobras, Brazil)
2. Carlo Giavadrini, Keith Hester, *Gas Hydrates: Immense Energy Potential and Environmental Challenges*, Pages displayed by permission of Springer Science & Business Media (The data was taken from Page 34, converted to US units and plotted)
3. David J. Tenenbaum, *Melting Methane: New Thermometer for Ancient Ocean?* (Illustration credited to: National Energy Technology Laboratory)
4. Hirpa L. Gelgele, Dr. Ing, Assoc. Professor, University of Stavanger, Dept. of Mechanical and Structural Engineering and Material Technology, N-4036 Stavanger, Norway, STUDY OF CONTACT AREA AND RESISTANCE IN CONTACT DESIGN OF TUBING CONNECTIONS, 13th International Research/Expert Conference, "Trends in the Development of Machinery and Associated Technology", TMT 2009, Hammamet, Tunisia, 21-26 Oct. 2009

5. Contact Resistance in Connection with Rail Bonding, Street Railway Journal, Vol. XXX No. 11, McGraw Publishing Company, New York, Saturday, Sep. 14, 1907, pages 389-391.

All references cited herein are incorporated by reference. Although the disclosure has been disclosed with reference to its preferred embodiments, from reading this description those of skill in the art may appreciate changes and modification that may be made which do not depart from the scope and spirit of the disclosure as described above and claimed hereafter.

We claim:

1. An apparatus comprising:
   at least two subsea electrode assemblies detachably or affixedly attached to a flowline at locations along a length of the flowline so that the electrode assemblies are separated by distances d, which may be the same or different, defining one or a plurality of flowline sections to be heated, where each electrode assembly includes:
   two clamping members, each of the members has an inner surface and an outer surface,
   two electrodes, each of the electrodes has an inner surface and an outer surface,
   two hydraulic chambers, each of the chambers has a hydraulic fluid inlet,
   a hydraulically actuated hinge assembly including:
     a first arm integral with or attached to one of the clamping members, and
     a second arm integral with or attached to the other clamping member,
     where the hinge assembly is pivotally mounted on a pin and mounted on a hydraulic actuator, which opens and closes the members, and
   a low voltage, high current connector that is adapted to connect the electrodes to a low voltage, high current cable,
   wherein the inner surface of each of the electrodes is adapted to form an electrical contact between a metal surface of the flowline at each of the locations so that when a low voltage high current electric input is applied across the flowline sections between two electrodes, the current flow heats the metal of the flowline sections for a time sufficient to dissociate hydrates and/or unplug each of the flowline sections, and
   wherein the electrodes comprise copper, ruthenium, rhodium, palladium, silver, osmium, iridium, platinum, gold, carbon (graphene), annealed copper, gold, aluminum, calcium, tungsten, zinc, nickel, lithium, iron, tin, lead, copper-silver alloys, copper-cadmium alloys, copper-beryllium alloys, copper-chromium alloys, copper-chromium-zirconium alloys, copper-chromium-magnesium alloys, copper-zirconium alloys, copper-nickel alloys, copper-nickel-silicon alloys, copper-nickel-phosphorus alloys, copper-nickel-tin alloys, conductive polymers, or mixtures and combinations thereof.

2. The apparatus of claim 1, further comprising:
   a subsea high current power supply system including:
     a step-down transformer having:
       a high voltage fixed quick disconnect connector disposed on a top of or adjacent to the transformer,
       a primary winding that receives a high voltage input,
       a secondary winding that produces a low voltage, high current output, and two high current fixed connectors connected to the secondary winding, where the connectors are disposed on one or more sides of the step-down transformer, and
     two high current cables including high current cable connectors adapted to engage the high current fixed connectors and the high current electrode connectors.

3. The apparatus of claim 2, further comprising:
   a vessel based high voltage power supply subsystem including:
     a motor or engine,
     a generator or alternator,
     a flying lead,
     a reel,
     a high voltage cable including a removable quick disconnect connector, and
     a matching transformer to match the output of the generator to the input of the high voltage cable if required,
   where the high voltage cable connects an output of the generator or the matching transformer to the quick disconnect connector of the step down transformer.

4. The apparatus of claim 1, wherein:
   each of the chambers is adapted to receive a hydraulic fluid under pressure via its inlet,
   where the hydraulic pressure forces each of the inner electrode surfaces into conformity with its corresponding flowline surface to improve a conductivity of the contacts.

5. The apparatus of claim 1, wherein:
   each of the electrodes comprises a malleable electrically conductive material and
   each of the electrode assemblies further includes a seal to seal the assembly,
   where each of the chambers is defined between the inner surface of its clamping member and the outer surface of its electrode,
   where each of the chambers is adapted to receive a hydraulic fluid under pressure via its inlet, and
   where the hydraulic pressure forces each of the inner electrode surfaces into conformity with its corresponding flowline surface to improve a conductivity of the contacts.

6. The apparatus of claim 1, wherein:
   each of the electrode comprises a malleable electrically conductive material and
   each electrode assembly further includes a bladder having a hydraulic fluid inlet,
   where each of the chambers is defined between the inner surface of its clamping member and the outer surface of its electrode and each of the bladders is disposed within each of the chambers,
   where each of the bladders is adapted to receive a hydraulic fluid under pressure via its inlet, and
   where the hydraulic pressure forces each of the inner electrode surfaces into conformity with its corresponding flowline surface to improve a conductivity of the contacts.

7. The apparatus of claim 6, wherein each of the bladders comprises a flexible material and is shaped to conform to its corresponding chamber.

8. The apparatus of claim 7, wherein the flexible material is rubber.

9. The apparatus of claim 1, wherein:
   each of the electrodes comprises a hollow structure, where an interior of each of the hollow structures defines its chambers,
where each of the hollow structures is adapted to receive a hydraulic fluid under pressure via its inlet, and
where the hydraulic pressure forces each of the inner electrode surfaces into conformity with its corresponding flowline surface to improve a conductivity of the contacts.

10. The apparatus of claim 1, wherein:
each of the electrodes includes a thin layer deposited on each of the electrode inner surfaces, where each of the layer comprises:
(a) a soft electrically conductive material,
(b) a paste including a base material and a powdered conductive material, or
(c) mixtures and combinations thereof,
wherein:
the soft electrically conductive material comprises aluminum, antimony, bismuth, brass, calcium, copper, gallium, gold, indium, lead, magnesium, palladium, platinum, selenium, silver, strontium, tellurium, tin, zinc, or mixtures and combinations thereof,
the base material comprises a hydrocarbon based oil, a silicone based oil, a hydrocarbon based grease, a silicon based grease, a polymer, an elastomer, a conductive polymer, or mixtures and combinations thereof, and
the powdered conductive material comprises copper, ruthenium, rhodium, palladium, silver, osmium, iridium, platinum, gold, carbon (graphene), annealed copper, gold, aluminum, calcium, tungsten, zinc, nickel, lithium, iron, tin, lead, copper-silver alloys, copper-cadmium alloys, copper-beryllium alloys, copper-chromium alloys, copper-chromium-zirconium alloys, copper-chromium-magnesium alloys, copper-zirconium alloys, copper-nickel alloys, copper-nickel-silicon alloys, copper-nickel-phosphorus alloys, copper-nickel-tin alloys, conductive polymers, or mixtures and combinations thereof.

11. The apparatus of claim 1, further comprising:
at least one ROV to connect and disconnect removable connectors to and from fixed connectors, to position assemblies on the flowlines, or to perform any other subsea operation.

12. A method comprising:
providing an apparatus comprising:
a subsea high current power supply system including:
a step-down transformer having:
a high voltage quick disconnect connector disposed on a top of or adjacent to the transformer,
a high voltage, lower current primary winding,
a low voltage, high current secondary winding, and
two high current transformer connectors connected to the secondary winding, where the connectors are disposed on two opposing sides of the step-down transformer, and
two high current cables including high current cable connectors adapted to engages the high current transformer connectors and high current electrode connectors,
a subsea electrode system including:
a pair of electrode assemblies detachably or affixedly attached to a flowline at two locations along a length of the flowline separated by a distance d defining a flowline section to be heated, where each electrode assembly includes:
two clamping members,
two electrodes,
two hydraulic chambers,
two hydraulic fluid inlets,
a hydraulically actuated hinge assembly including:
a first arm integral with or attached to one of the clamping members, and
a second arm integral with or attached to the other clamping members,
pivotally mounted on a pin and mounted on a hydraulic actuator, which opens and closes the members,
a high current connector connected to one of the high current electrode connectors or the high current cables,
attaching each of the electrode assemblies at each of the locations,
applying a low voltage, high current input to each of the electrodes and allowing a high current to flow through each of the flowline sections to heat the metal of each of the flowline sections,
continuing the input through each of the flowline sections for a time sufficient for the metal in each of the sections heating each of the flowline sections to dissociate hydrates in and/or unplug hydrate plug from each of the flowline sections,
wherein the electrodes comprise copper, ruthenium, rhodium, palladium, silver, osmium, iridium, platinum, gold, carbon (graphene), annealed copper, gold, aluminum, calcium, tungsten, zinc, nickel, lithium, iron, tin, lead, copper-silver alloys, copper-cadmium alloys, copper-beryllium alloys, copper-chromium alloys, copper-chromium-zirconium alloys, copper-chromium-magnesium alloys, copper-zirconium alloys, copper-nickel alloys, copper-nickel-silicon alloys, copper-nickel-phosphorus alloys, copper-nickel-tin alloys, conductive polymers, or mixtures and combinations thereof.

13. The method of claim 12, wherein:
each of the chambers is adapted to receive a hydraulic fluid under pressure via its inlet,
where the hydraulic pressure forces each of the inner electrode surfaces into conformity with its corresponding flowline surface to improve a conductivity of the contacts.

14. The method of claim 12, wherein:
each of the electrodes comprises a malleable electrically conductive material and
each of the electrode assemblies further includes a seal to seal the assembly,
where each of the chambers is defined between the inner surface of its clamping member and the outer surface of its electrode,
where each of the chambers is adapted to receive a hydraulic fluid under pressure via its inlet, and
where the hydraulic pressure forces each of the inner electrode surfaces into conformity with its corresponding flowline surface to improve a conductivity of the contacts.

15. The method of claim 12, wherein:
each of the electrode comprises a malleable electrically conductive material and
each electrode assembly further includes a bladder having a hydraulic fluid inlet,
where each of the chambers is defined between the inner surface of its clamping member and the outer surface of its electrode and each of the bladders is disposed within each of the chambers, where each of the bladders is adapted to receive a hydraulic fluid under pressure via its inlet, and
where the hydraulic pressure forces each of the inner electrode surfaces into conformity with its corresponding flowline surface to improve a conductivity of the contacts.

16. The method of claim 15, wherein each of the bladders comprises a flexible material and is shaped to conform to its corresponding chamber.

17. The method of claim 16, wherein the flexible material is rubber.

18. The method of claim 12, wherein:
each of the electrodes comprises a hollow structure,
where an interior of each of the hollow structures defines its chambers,
where each of the hollow structures is adapted to receive a hydraulic fluid under pressure via its inlet, and
where the hydraulic pressure forces each of the inner electrode surfaces into conformity with its corresponding flowline surface to improve a conductivity of the contacts.

19. The method of claim 12, wherein:
each of the electrodes includes a thin layer deposited on each of the electrode inner surfaces,
where each of the layer comprises:
  (a) a soft electrically conductive material,
  (b) a paste including a base material and a powdered conductive material, or
  (c) mixtures and combinations thereof,
wherein:
  the soft electrically conductive material comprises aluminum, antimony, bismuth, brass, calcium, copper, gallium, gold, indium, lead, magnesium, palladium, platinum, selenium, silver, strontium, tellurium, tin, zinc, or mixtures and combinations thereof,
  the base material comprises a hydrocarbon based oil, a silicone based oil, a hydrocarbon based grease, a silicon based grease, a polymer, an elastomer, a conductive polymer, or mixtures and combinations thereof, and
  the powdered conductive material comprises copper, ruthenium, rhodium, palladium, silver, osmium, iridium, platinum, gold, carbon (graphene), annealed copper, gold, aluminum, calcium, tungsten, zinc, nickel, lithium, iron, tin, lead, copper-silver alloys, copper-cadmium alloys, copper-beryllium alloys, copper-chromium alloys, copper-chromium-zirconium alloys, copper-chromium-magnesium alloys, copper-zirconium alloys, copper-nickel alloys, copper-nickel-silicon alloys, copper-nickel-phosphorus alloys, copper-nickel-tin alloys, conductive polymers, or mixtures and combinations thereof.

20. The method of claim 12, further comprising:
at least one ROV to connect and disconnect removable connectors to and from fixed connectors, to position assemblies on the flowlines, or to perform any other subsea operation.

* * * * *